(12) United States Patent
Kageyama et al.

(10) Patent No.: US 7,830,369 B2
(45) Date of Patent: Nov. 9, 2010

(54) VIDEO SIGNAL PROCESSING APPARATUS, VIDEO DISPLAYING APPARATUS AND HIGH RESOLUTION METHOD FOR VIDEO SIGNAL

(75) Inventors: Masahiro Kageyama, Hino (JP); Koichi Hamada, Yokohama (JP); Shigeki Nagaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 867 days.

(21) Appl. No.: 11/785,060

(22) Filed: Apr. 13, 2007

(65) Prior Publication Data
US 2008/0018786 A1     Jan. 24, 2008

(30) Foreign Application Priority Data
May 31, 2006   (JP)   ............... 2006-150875

(51) Int. Cl.
G06F 3/038   (2006.01)
(52) U.S. Cl. .................. 345/204; 345/690; 348/441
(58) Field of Classification Search ........... 345/204, 345/690; 348/294, 441–443, 448; 386/46, 386/96
See application file for complete search history.

(56) References Cited

U.S. PATENT DOCUMENTS

| | | | |
|---|---|---|---|
| 5,617,135 A * | 4/1997 | Noda et al. ............... 348/14.12 |
| 6,023,535 A | 2/2000 | Aoki | |
| 6,466,253 B1 | 10/2002 | Honjoh | |
| 7,221,381 B2 * | 5/2007 | Elliott et al. ............... 345/690 |
| 2002/0105506 A1* | 8/2002 | Hiyama et al. ............... 345/204 |
| 2005/0128307 A1 | 6/2005 | Kobayashi et al. | |

(Continued)

FOREIGN PATENT DOCUMENTS

EP     1 492 051 A2   12/2004

(Continued)

OTHER PUBLICATIONS

Shin Aoki, "Super Resolution Processing by Plural Number of Lower Resolution Images," Ricoh Technical Report No. 24, Nov. 1998, pp. 19-25.

(Continued)

*Primary Examiner*—Kimnhung Nguyen
(74) *Attorney, Agent, or Firm*—McDermott Will & Emery LLP

(57) ABSTRACT

A video signal processing apparatus, for achieving high resolution of a video signal, in particular, the video signal of moving pictures, preferably, comprises a motion estimation portion (101) for estimating a sampling phase difference with using video data on an input video frame as a reference and each video data on other input video frame, a motion compensation/up-rate portion (115) for compensating motion of the video data of the each input video frame with using information of said sampling phase difference, as well as, to increase the number of pixels to n times, a phase shift portion (116) for shifting the video data of each of the video frames, the pixel number of which is increased, by a predetermined amount, a coefficient determining portion, which is configured to determine a coefficient with using information of said sampling phase difference; and an aliasing component removal portion (117) for removing (n−1) pieces of aliasing components, by adding each of video data in front and back of said phase shifting after multiplying them by said coefficient, thereby to provide an output.

15 Claims, 17 Drawing Sheets

U.S. PATENT DOCUMENTS

| | | | |
|---|---|---|---|
| 2005/0190292 A1* | 9/2005 | Yu et al. | 348/441 |
| 2005/0201735 A1* | 9/2005 | Jeon | 386/96 |
| 2006/0038918 A1* | 2/2006 | De Haan | 348/441 |
| 2006/0133668 A1* | 6/2006 | Kita et al. | 382/162 |
| 2006/0146187 A1* | 7/2006 | Handjojo et al. | 348/448 |
| 2006/0268138 A1* | 11/2006 | Higashitsutsumi | 348/294 |

FOREIGN PATENT DOCUMENTS

| | | |
|---|---|---|
| JP | 07-245592 | 9/1995 |
| JP | 10-341367 | 12/1998 |
| JP | 2005-18522 A | 1/2005 |
| JP | 2005-173158 A | 6/2005 |

OTHER PUBLICATIONS

Shigeru Ando, "A Velocity Vector Field Measurement System Based on Spatio-Temporal Image Derivative," Papers of Measurement Automatic Control Academic Society, pp. 1330-1336, vol. 22, No. 12, 1986.

Hiroyuki Kobayashi et al., "Calculation Methods of a Phase-Only Correlation Function for Images based on Discrete Cosine Transform," The Institute of Electronics Information and Communication Engineers, IEICE Technical Report, ITS200592, IE2005-299 (Feb. 2006), pp. 73-78.

United Kingdom Search and Examination Report, issued in United Kingdom Patent Application No. GB0707105.3, dated on Jul. 31, 2007.

Korean Office Action issued in Korean Patent Application No. KR 10-2007-0036887 dated on May 26, 2008.

Japanese Notification of Reasons for Refusal, w/ English translation thereof, issued in Japanese Patent Application No. JP 2006-150875 dated Feb. 9, 2010.

* cited by examiner

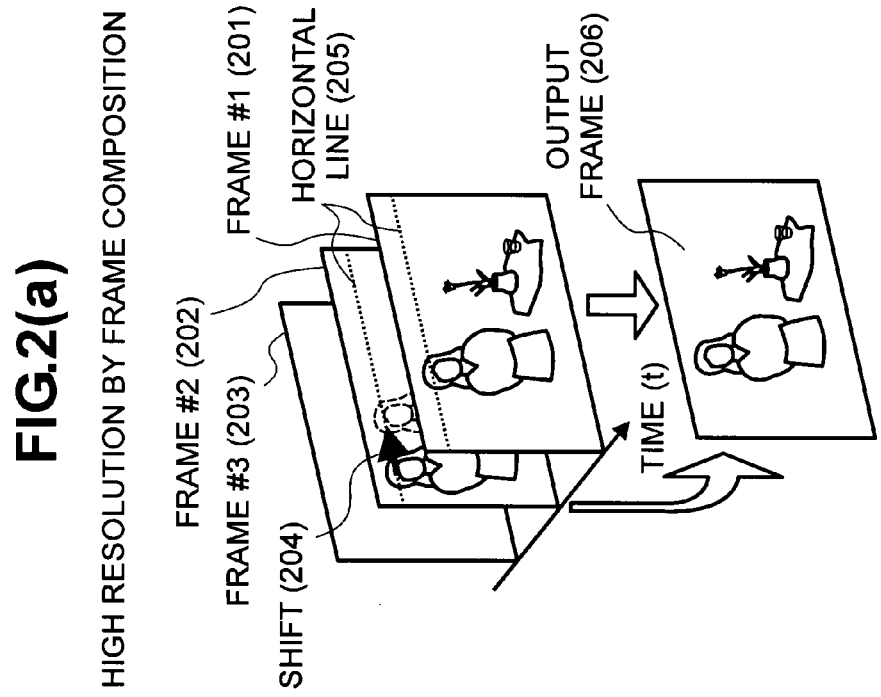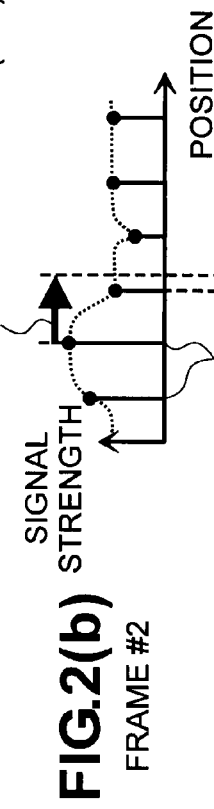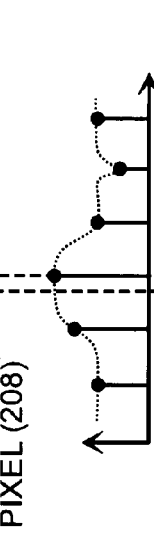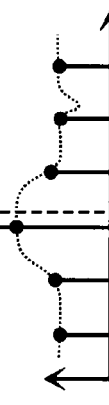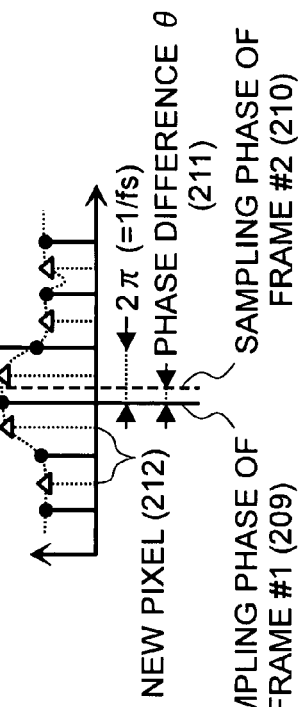

PHASE RELATIONSHIP OF EACH COMPONENT

PHASE RELATIONSHIP OF ORIGINAL COMPONENTS

PHASE RELATIONSHIP OF ALIASING COMPONENTS

PHASE RELATIONSHIP OF EACH COMPONENT

PHASE RELATIONSHIP OF ORIGINAL COMPONENTS

PHASE RELATIONSHIP OF ALIASING COMPONENTS

"FREQUENCY-GAIN" CHARACTERISTIC

"FREQUENCY-GAIN" CHARACTERISTIC

"FREQUENCY-PHASE DIFFERENCE" CHARACTERISTIC

TAP COEFFICIENT C

FIG.9(a)

(1) SUM OF ORIGINAL COMPONENTS ON Re AXIS=1
(2) SUM OF ORIGINAL COMPONENTS ON Im AXIS=0
(3) SUM OF ALIASING COMPONENTS ON Re AXIS=0
(4) SUM OF ALIASING COMPONENTS ON Im AXIS=0

FIG.9(b)

(1) $C_0 + C_2 = 1$
(2) $C_1 + C_3 = 0$
(3) $C_0 + C_2 \cdot \cos\theta - C_3 \cdot \sin\theta = 0$
(4) $C_1 + C_2 \cdot \sin\theta + C_3 \cdot \cos\theta = 0$

FIG.9(c)

$C_0 = 1/2$
$C_1 = -(1+\cos\theta)/2\sin\theta$
$C_2 = 1/2$
$C_3 = (1+\cos\theta)/2\sin\theta$

FIG.9(d)

| $\theta$ | C0 | C1 | C2 | C3 |
|---|---|---|---|---|
| 0 | 0.5 | — | 0.5 | — |
| $\pi/8$ | 0.5 | -2.51 | 0.5 | 2.51 |
| $2\pi/8$ | 0.5 | -1.21 | 0.5 | 1.21 |
| $3\pi/8$ | 0.5 | -0.75 | 0.5 | 0.75 |
| $4\pi/8$ | 0.5 | -0.5 | 0.5 | 0.5 |
| $5\pi/8$ | 0.5 | -0.33 | 0.5 | 0.33 |
| $6\pi/8$ | 0.5 | -0.21 | 0.5 | 0.21 |
| $7\pi/8$ | 0.5 | -0.1 | 0.5 | 0.1 |
| $8\pi/8$ | 0.5 | 0 | 0.5 | 0 |
| $9\pi/8$ | 0.5 | 0.1 | 0.5 | -0.1 |
| $10\pi/8$ | 0.5 | 0.21 | 0.5 | -0.21 |
| $11\pi/8$ | 0.5 | 0.33 | 0.5 | -0.33 |
| $12\pi/8$ | 0.5 | 0.5 | 0.5 | -0.5 |
| $13\pi/8$ | 0.5 | 0.75 | 0.5 | -0.75 |
| $14\pi/8$ | 0.5 | 1.21 | 0.5 | -1.21 |
| $15\pi/8$ | 0.5 | 2.51 | 0.5 | -2.51 |

FIG.13

| θ | C0 | C1 | C4 |
|---|---|---|---|
| 0 | 0 | 0 | 1.0 |
| $\pi/8$ | 0 | 0 | 1.0 |
| $2\pi/8$ | 0.5 | -1.21 | 0 |
| $3\pi/8$ | 0.5 | -0.75 | 0 |
| $4\pi/8$ | 0.5 | -0.5 | 0 |
| $5\pi/8$ | 0.5 | -0.33 | 0 |
| $6\pi/8$ | 0.5 | -0.21 | 0 |
| $7\pi/8$ | 0.5 | -0.1 | 0 |
| $8\pi/8$ | 0.5 | 0 | 0 |
| $9\pi/8$ | 0.5 | 0.1 | 0 |
| $10\pi/8$ | 0.5 | 0.21 | 0 |
| $11\pi/8$ | 0.5 | 0.33 | 0 |
| $12\pi/8$ | 0.5 | 0.5 | 0 |
| $13\pi/8$ | 0.5 | 0.75 | 0 |
| $14\pi/8$ | 0.5 | 1.21 | 0 |
| $15\pi/8$ | 0 | 0 | 1.0 |

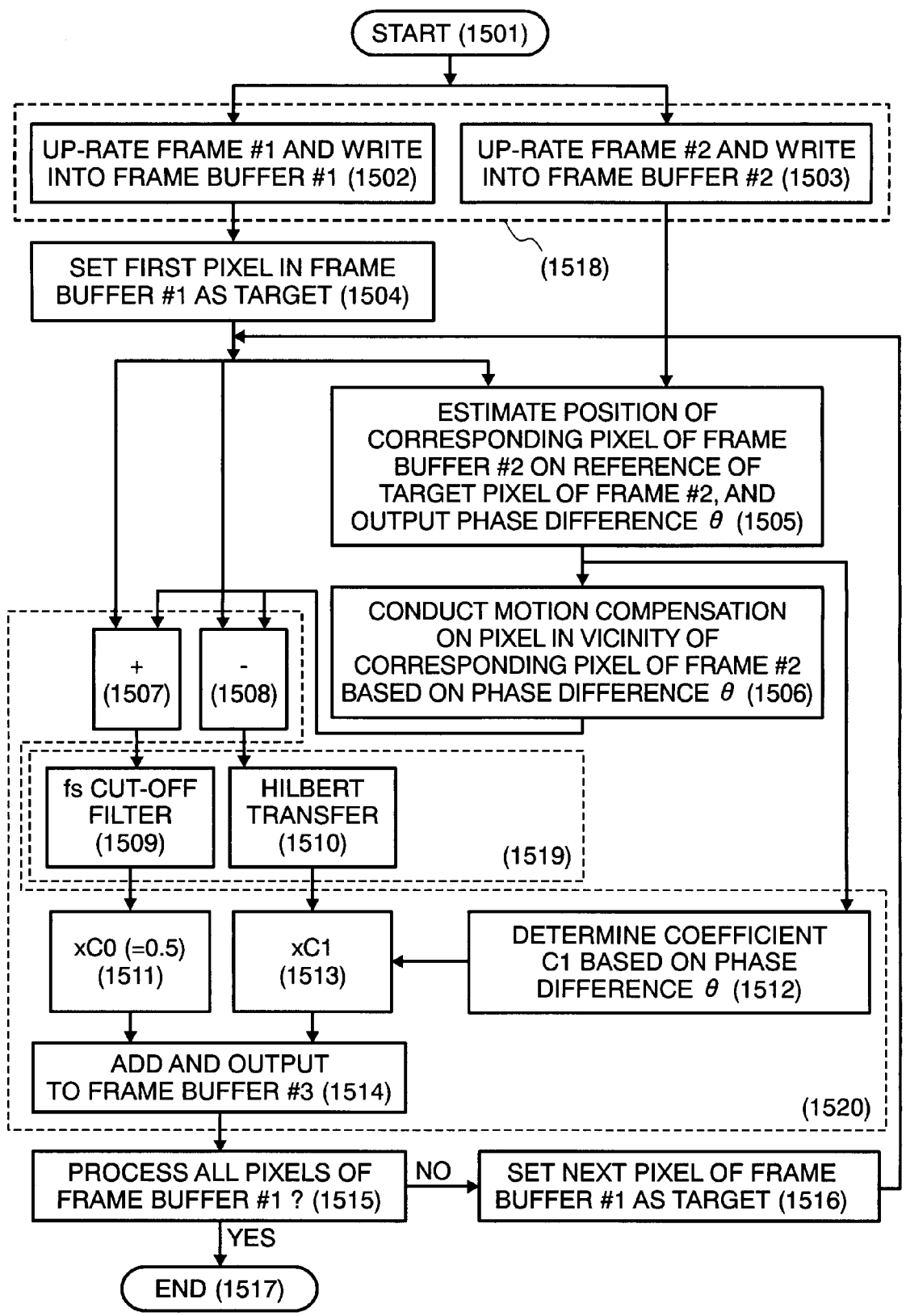

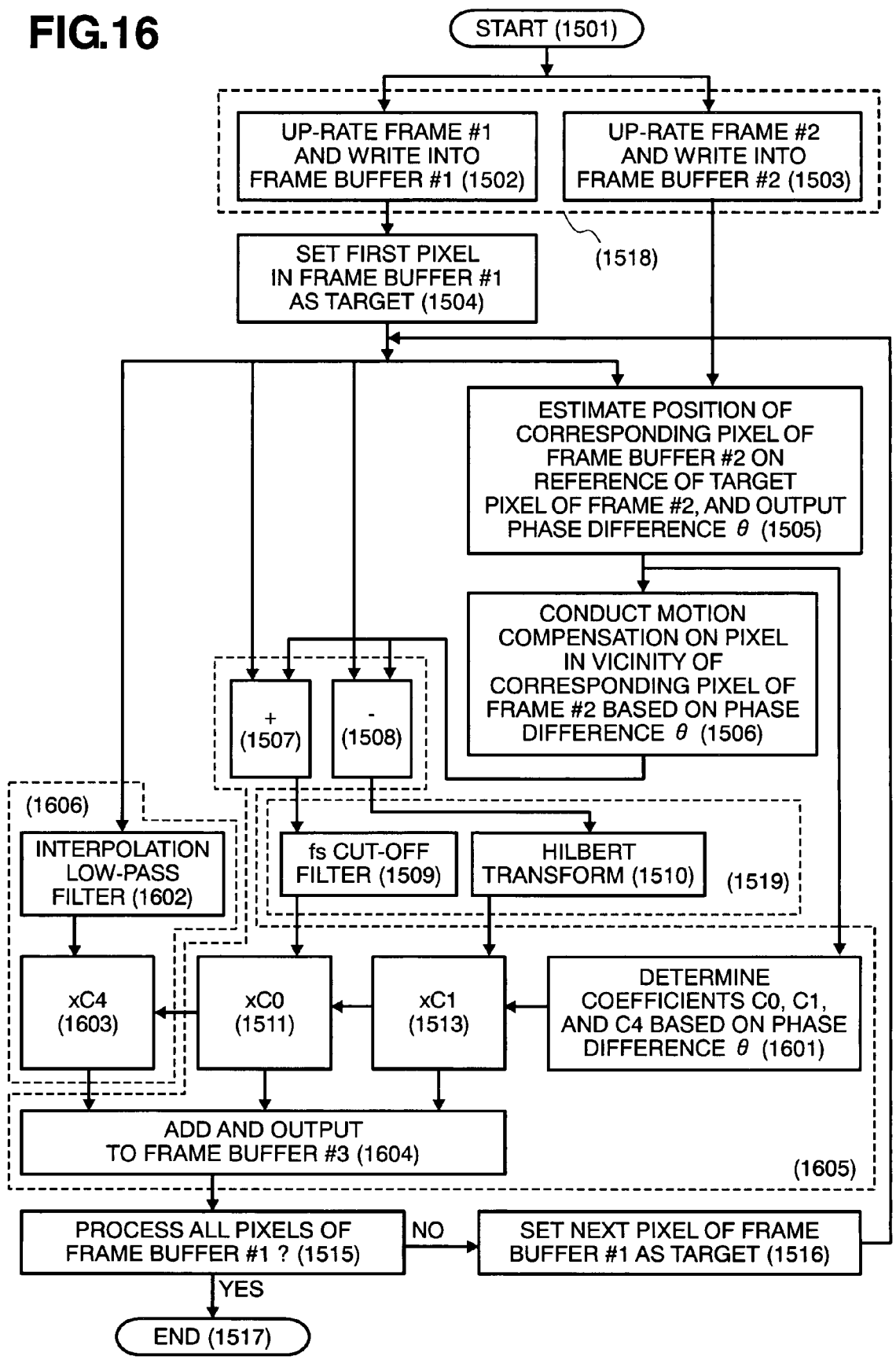

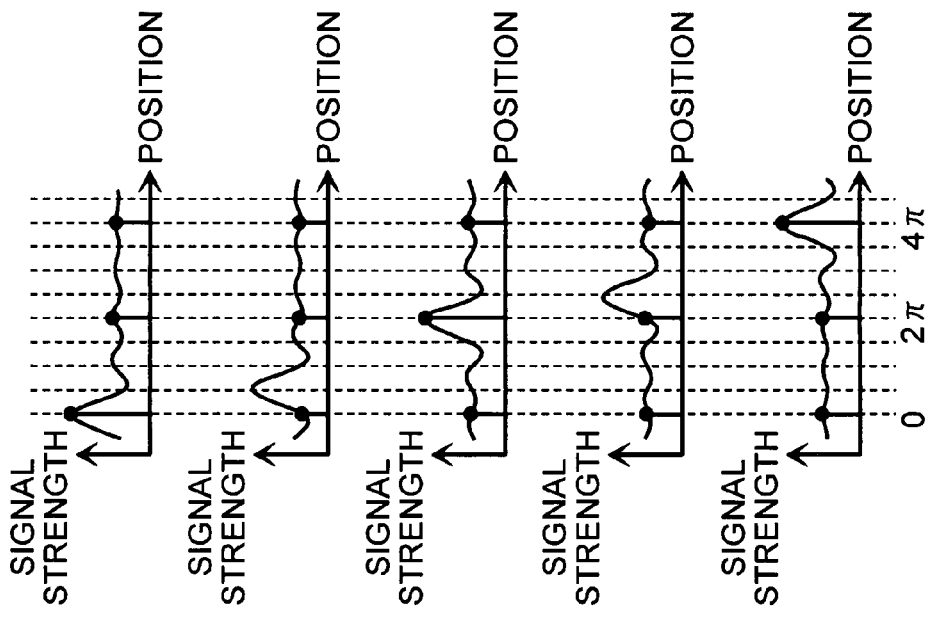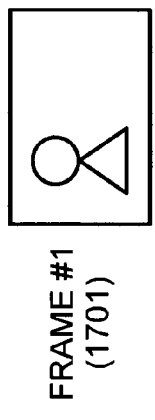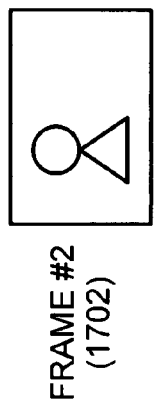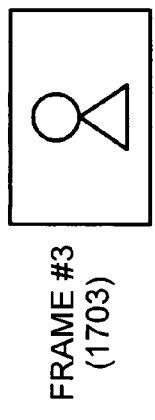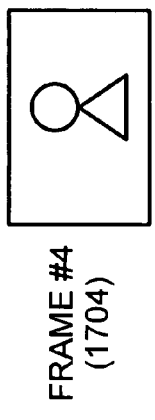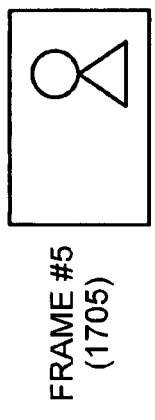

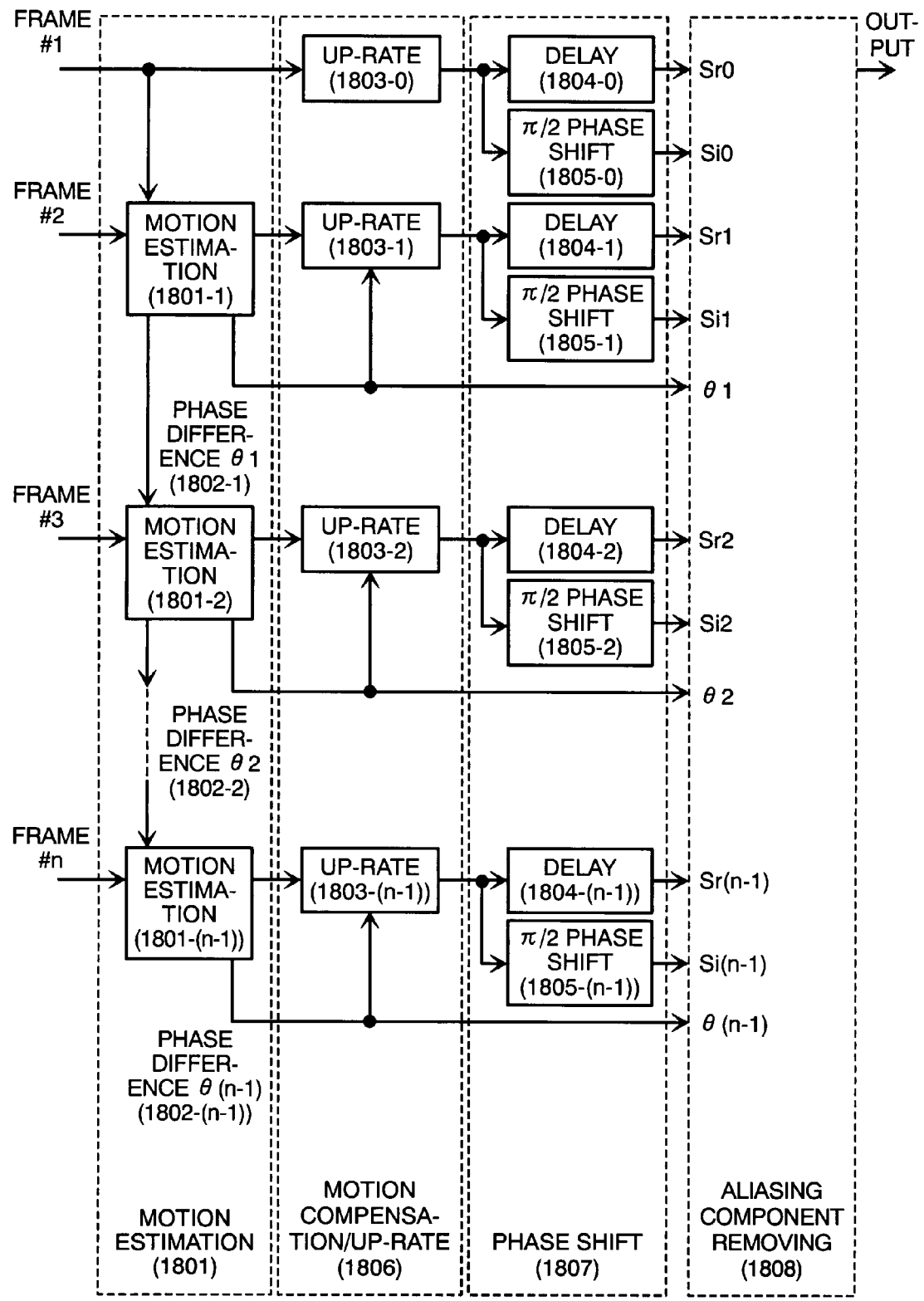

FIG.19(a)

OUTPUT = $C_{r0} \cdot S_{r0} + C_{i0} \cdot S_{i0} + C_{r1} \cdot S_{r1} + C_{i1} \cdot S_{i1} + C_{r2} \cdot S_{r2} + C_{i2} \cdot S_{i2} + \cdots + C_{r(n-1)} \cdot S_{r(n-1)} + C_{i(n-1)} \cdot S_{i(n-1)}$

FIG.19(b)

$$
\begin{pmatrix} 1 \\ 0 \\ 0 \\ 0 \\ 0 \\ 0 \\ \vdots \\ 0 \\ 0 \end{pmatrix}
=
\begin{pmatrix}
1 & 0 & 1 & 0 & 1 & 0 & \cdots & 1 & 0 \\
0 & 1 & 0 & 1 & 0 & 1 & \cdots & 0 & 1 \\
1 & 0 & \cos\theta_1 & -\sin\theta_1 & \cos\theta_2 & -\sin\theta_2 & \cdots & \cos\theta_{(n-1)} & -\sin\theta_{(n-1)} \\
0 & 1 & \sin\theta_1 & \cos\theta_1 & \sin\theta_2 & \cos\theta_2 & \cdots & \sin\theta_{(n-1)} & \cos\theta_{(n-1)} \\
1 & 0 & \cos2\theta_1 & -\sin2\theta_1 & \cos2\theta_2 & -\sin2\theta_2 & \cdots & \cos2\theta_{(n-1)} & -\sin2\theta_{(n-1)} \\
0 & 1 & \sin2\theta_1 & \cos2\theta_1 & \sin2\theta_2 & \cos2\theta_2 & \cdots & \sin2\theta_{(n-1)} & \cos2\theta_{(n-1)} \\
\vdots & \vdots & \vdots & \vdots & \vdots & \vdots & \cdots & \vdots & \vdots \\
1 & 0 & \cos(n-1)\theta_1 & -\sin(n-1)\theta_1 & \cos(n-1)\theta_2 & -\sin(n-1)\theta_2 & \cdots & \cos(n-1)\theta_{(n-1)} & -\sin(n-1)\theta_{(n-1)} \\
0 & 1 & \sin(n-1)\theta_1 & \cos(n-1)\theta_1 & \sin(n-1)\theta_2 & \cos(n-1)\theta_2 & \cdots & \sin(n-1)\theta_{(n-1)} & \cos(n-1)\theta_{(n-1)}
\end{pmatrix}
\begin{pmatrix} C_{r0} \\ C_{i0} \\ C_{r1} \\ C_{i1} \\ C_{r2} \\ C_{i2} \\ \vdots \\ C_{r(n-1)} \\ C_{i(n-1)} \end{pmatrix}
$$

VIDEO SIGNAL PROCESSING APPARATUS, VIDEO DISPLAYING APPARATUS AND HIGH RESOLUTION METHOD FOR VIDEO SIGNAL

BACKGROUND OF THE INVENTION (1) Field of the Invention

The present invention relates to a technology for obtaining a high-resolution video signal from a video signal, and in particular, it relates to a technology for achieving the high resolution, with increasing a number of pixels building up a video frame and removing unnecessary aliasing, while composing or combing a plural number of video frames.

(2) Description of the Related Art

In recent years, advancement is made on large sizing of the screen, for television receivers, and accompanying with this, it is common that the video signal inputted from broadcasting, communication and/or storage medium, etc., is not displayed on it as it is, but is displayed with increasing the pixel numbers in the horizontal/vertical directions through digital signal processing. In this instance, however, it is impossible to increase the resolution only by increasing the pixel number, through an interpolation low-pass filter using sinc function or spline function, being well-know in general.

Then, as is already described in a reference document 1, there is proposed a technology (hereinafter, the conventional art) for increasing the pixel number while achieving the high resolution at the same time, by composing or synthesizing a plural number of picture or video frames (hereinafter, being called only "frame", in brief). With this conventional art, the high resolution can be obtained through three processes, (1) motion estimation, (2) broadband interpolation, and (3) a weighted sum. Herein, the (1) motion estimation is a process for assuming or estimating difference in the sampling phase (or sampling position) for each video data, with using the each video data of the plural number of video frames inputted. The (2) broadband interpolation is a process for increasing the pixel number (i.e., sampling points) of the each video data, including the aliasing components therein, through interpolation, with use of a wideband low-pass filter for transmitting all of the high-frequency components of an original signal, thereby obtaining high resolution of the video data. The (3) weighted sum is a process for negating the aliasing components generated when sampling the pixels, by taking the weighted sum depending on the sampling phase of each high-density data, so as to remove them, and at the same time restoring the high-frequency components of the original signal.

FIGS. 2(a) to 2(e) shows this high-resolution technology, in brief. As is shown in FIG. 2(a), herein it is assumed that a frame #1 (201), a frame #2 (202) and a frame #3 (203) on different time axes are inputted, to be composed with, thereby obtaining an output frame (206). For the purpose of simplification, first of all, consideration is paid upon case where the target moves into the horizontal direction (204), i.e., achieving the high resolution through a linear signal processing on a horizontal line (205). In this instance, as is shown in FIGS. 2(b) and 2(d), between the frame #2 (202) and the frame #1 (201) is generated a positional difference depending on an amount of moving (204) of the target. This positional difference is obtained through the (1) motion estimation mentioned above, thereby to make such motion compensation (207) upon the frame #2 (202) that no positional difference is generated, as is shown in FIG. 2(c), and at the same time, phase difference θ is obtained between the sampling phases (209) and (210) of pixels (208) for each frame. Through conducting the (2) broadband interpolation and the (3) weighted sum mentioned above, upon this phase difference θ (211), a new pixel (212) can be produced at a position just between the original pixels (208) (i.e., phase difference θ=π); thereby achieving the high resolution. Herein, as a technology of achieving such the (1) motion estimation mentioned above, a large number of methods are already proposed, as described in reference documents 2 and 3, for example, and it can be applied as it is. The (2) broadband interpolation can be achieved by means of a general low-pass filter, having pass band doubled to Nyquist frequency, as is described in the reference document 1. The (3) weighted sum will be mentioned later. However, in actual, it must be also considered that the movement of the target includes, not only the parallel movement, but also accompanying movements of rotation, expansion and reduction, etc.; however, in case where the time distance between the frames is very small and/or when the target moves slowly, it is possible to consider those movements with approximating them into a local parallel movement.

(Reference Document 1) Shin AOKI "Super Resolution Processing by Plural Number of Lower Resolution images", Ricoh Technical Report pp. 19-25, No. 24, NOVEMBER, 1998;

(Reference Document 2) Shigeru ANDO "A Velocity Vector Field Measurement System Based on Spatio-Temporal Image Derivative", Papers of Measurement Automatic Control Academic Society, pp. 1330-1336, Vol. 22, No. 12, 1986; and (Reference Document 3) Hiroyuki KOBAYASHI et al. "Calculation Method of a Phase-Only Correlation Function for Images Based on Discrete Cosine Transform", IEICE Technical Report ITS2005-92, IE2005-299(2006-02), pp. 73-78.

SUMMARY OF THE INVENTION

In case when achieving the high resolution of 2-times in the one-dimensional direction with the conventional technologies mentioned above, as is shown in FIGS. 3(a) to 3(c), it is necessary to use signals of at least three (3) pieces of frame pictures or videos when conducting the weighted sum of the above (3). Herein, FIGS. 3(a) to 3(c) are views for showing frequency spectrums of each component, within the one-dimensional frequency region. In those figures, distance from the frequency axis shows signal strength, while rotation angle around the frequency axis shows the phase thereof. With the weighted sum of the above (3), detailed explanation thereof will be given below.

As was mentioned above, when conducting an interpolation upon pixels through a wideband low-pass filter for transmitting the frequency band (frequency band from 0 to sampling frequency fs) being 2-times of the Nyquist frequency, by the wideband interpolation of the above (2), sum can be obtained of the component same to the original signal (hereinafter, being called "original component") and the aliasing component depending on the sampling phase. In this instance, when conducting the wideband interpolation of the above (2) upon the signals of three (3) pieces of frame videos, as is shown in FIG. 3(a), it is well-known that all phases of the original components (301), (302) and (303) of each frame are coincident with one another, and that the phases of aliasing components (304), (305) and (306) rotate depending on the sampling phase of the each frame. For easy understanding of phase relationship between the respective ones, the phase relationship of the original components of the each frame is shown in FIG. 3(b), and the relationship of the aliasing components of the each frame in FIG. 3(c).

Herein, by conducting the weighted sum of the above (3) upon three (3) pieces of the signals of frame pictures or videos, while appropriately selecting the coefficients to be multiplied thereon, it is possible to remove the aliasing components of each frame, negating one another, and thereby to extract only the original component. In this instance, for the purpose of making the vectrial sum of aliasing components (304), (305) and (306) of the each frame zero (0), i.e., bringing both components on Re axis (i.e., a real axis) and Im axis (i.e., an imaginary axis) into zero (0), at least three (3) pieces of the aliasing components are necessary. Accordingly, for realizing the 2-times high resolution, i.e., for removing one (1) piece of the aliasing component, it is necessary to use the signals of at least three (3) pieces of frame video.

In the similar manner, as is described in the Reference Document 1, for achieving the high resolution higher than n-times (n: an integer equal to or greater than two (2)), i.e., for removing the (n−1) pieces of aliasing components, it is necessary to use the signals of at least (2n−1) pieces frame videos.

Accordingly, with the conventional technology, frame memory and the signal processing circuit becomes large in the scales thereof, and therefore not economic. Also, the necessity for conducting the motion estimation, correctly, upon a large number of frame videos separated on timing, brings the structures to be complex. Thus, with the conventional technology, it is difficult to obtain the high resolution of the moving pictures, such as, on the television broadcast signal, for example.

The present invention provides a technology for preferably achieving the high resolution of the video signals. In more details, the present invention provided the technology for preferably achieving the high resolution of the video signals, with using a less number of pieces of frames.

According to the present invention, an output video frame is obtained with increasing the number of pixels building up the video frame into n-times, by composing the video frame of n pieces of video frames (n: an integer equal to or greater than two (2)). In more details, according to the present invention, estimation is made on sampling phase difference with using the video data on the input video frame to be a reference and the corresponding one of the respective video data on the other input video frames, and motion compensation is made on the video data of each of the input video frames with using information of that sampling phase difference, wherein the pixel number is increased to n-times. And, after shifting the video data of the each frame, the pixel number of which is increased, by a predetermined amount of phase, a coefficient, which is determined upon basis of the sampling phase difference mentioned above, is multiplied upon the respective video data in front and back of that phase shifting, thereby removing the (n−1) pieces of aliasing components.

Also, it is possible to provide an auxiliary pixel interpolation means for increasing the video data of the input video frame through the interpolation, thereby outputting a result of that auxiliary pixel interpolation means, in the place of a result of removing the aliasing components mentioned above, when the above-mentioned coefficient cannot be determined, in the structures thereof.

Thus, according to the present invention, it is possible to achieve the high resolution of the video signals, in more preferable manner.

BRIEF DESCRIPTION OF THE SEVERAL VIEWS OF THE DRAWING

Those and other features, objects and advantages of the present invention will become more apparent from the following description when taken in conjunction with the accompanying drawings wherein:

FIGS. 2(a) to 2(e) are views for explaining operations of a general video signal processing for high resolution;

FIGS. 9(a) to 9(d) are views for explaining the first embodiment, according to the present invention;

FIG. 13 is a view for explaining the third embodiment, according to the present invention;

FIG. 15 is a view for explaining a fifth embodiment, according to the present invention;

FIG. 16 is a view for explaining a sixth embodiment, according to the present invention;

FIGS. 17(a) to 17(c) are views for explaining difference in the operations, between the present invention and the prior art;

FIG. 18 is a view for explaining a seventh embodiment, according to the present invention; and FIG. 19 is a view for explaining the seventh embodiment, according to the present invention.

DETAILED DESCRIPTION OF THE PREFERRED EMBODIMENTS

With a video signal processing apparatus according to embodiments of the present invention, a method for high resolution of video signals, and also a program for executing the same, aliasing components are removed from, shifting the phase of video data inputted by a predetermined amount (for example, $\pi/2$), when conducting the high resolution on the video signal. Hereinafter, embodiments according to the present invention will be fully explained by referring to the attached drawings.

Embodiment 1

Figure 1:
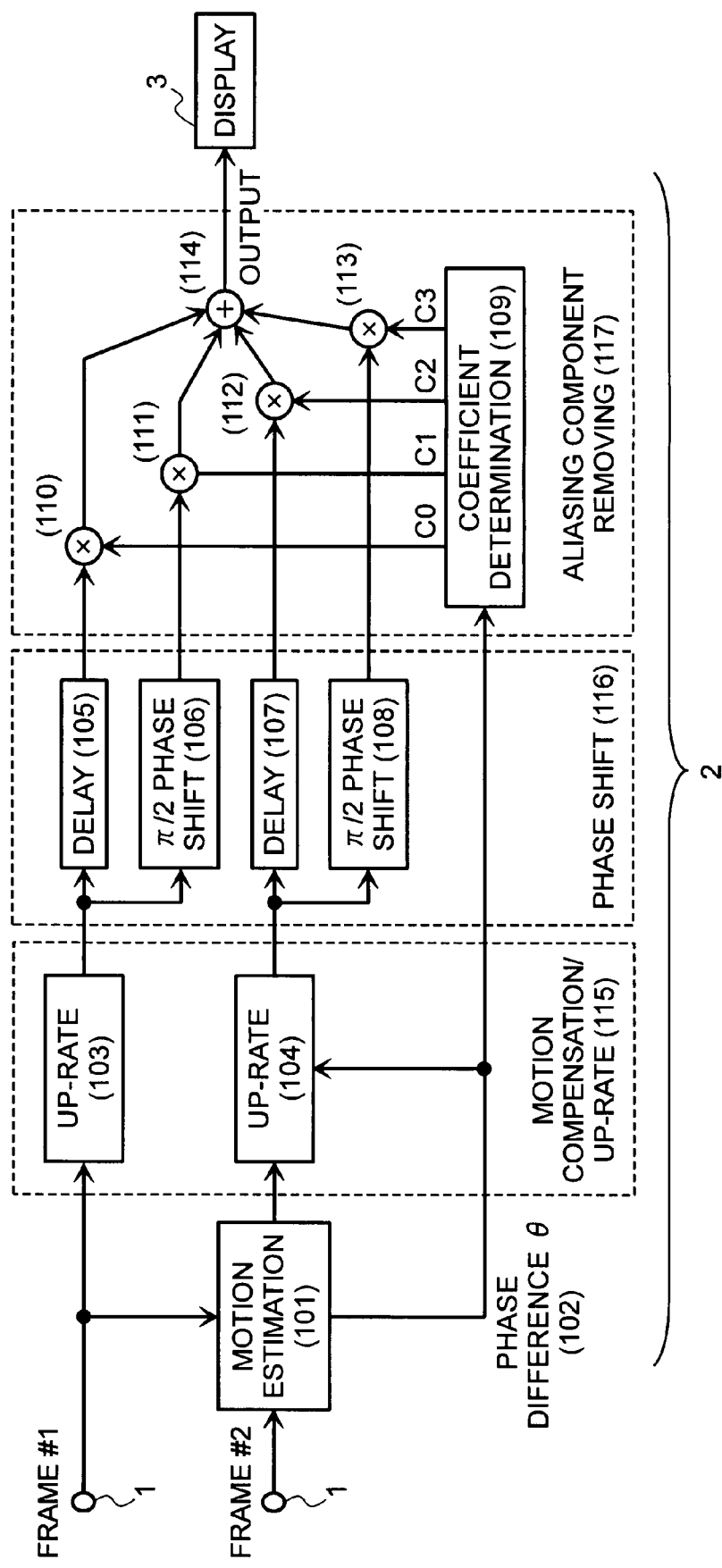
FIG. 1 is a block diagram for showing the configuration of a video signal processing apparatus, according to an embodiment of the present invention.
Figure 3A:
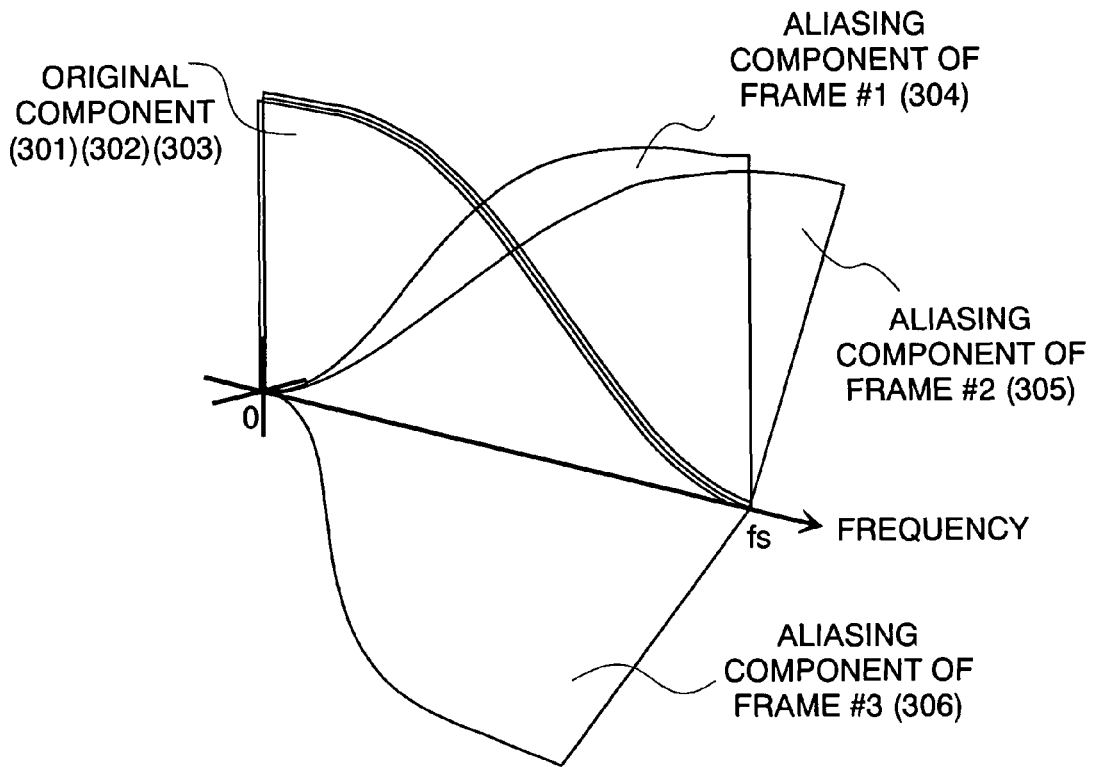
FIGS. 3(a) to 3(c) are views for explaining the operations in the prior art.
Figure 3B:
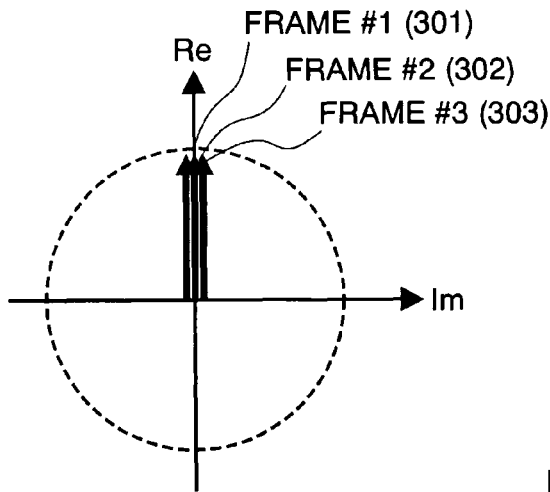
Figure 3C:
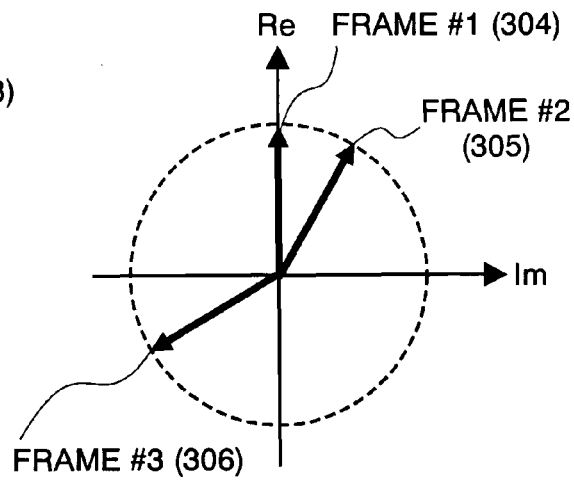

FIG. 1 shows a first embodiment of the video signal processing apparatus, according to the present invention, and the distinctive features thereof will be mentioned. The video signal processing apparatus, according to the present embodiment, will be applied into a video display apparatus, such as, a television receiver, etc., for example. In the present embodiment mentioned below, explanation will be made on the example of the video display apparatus, as the video signal processing apparatus. In FIG. 1, the video signal processing apparatus, according to the present embodiment, comprises an input portion 1, into which are inputted a frame line of moving pictures, such as, a television broadcast signal or the like, for example, a resolution converter portion 2 for obtaining high resolution of frames, which are inputted from that input portion, and further a display portion for displaying a picture upon basis of the frames, which are high resolved within that resolution converter portion 2. As this display portion 3 is applied a plasma display panel, a liquid crystal panel or an electron/electrolysis discharge type display panel. Hereinafter, detailed explanation will be made on the resolution converter portion 2.

In FIG. 1, first of all, by means of a motion estimation portion (101), upon basis of a sampling phase (sampling position) of pixel of a processing target on a frame #1 inputted into the input portion 1, estimation is made on a position of pixel corresponding on a frame #2, and thereby obtaining the sampling phase difference θ (102) thereof for each pixel. Next, by means of up-raters (103) and (104) of a motion compensation/up-rate portion (115), motion compensation is made upon the frame #2 with using information of the phase difference θ (102), so as to fit to the frame #1 in the position, as well as, increase the pixel numbers of the frames #1 and #2 up to two (2) times higher, respectively; thereby obtaining high density. In a phase-shift portion (116), the phase of this data high-densified is shifted by only a predetermined amount. Herein, as a means for shifting the phase of data by the predetermined amount, it is possible to use π/2 phase shifters (106) and (108). Also, for the purpose of compensation of delay, which is caused within those π/2 phase shifters (106) and (108), signals of the frames #1 and #2, which are high-densified, are delayed by means of retarders (105) and (107). In an aliasing component removal portion (117), each of output signals of the retarders (105) and (107) and Hilbert Transformers (106) and (108) is multiplied by an coefficient C0, C2, C1 or C3, which is produced upon basis of the phase difference θ (102) in a coefficient determining portion (109), respectively, within a multiplier (110), (112), (111) or (113), and then those signals are added within an adder (114); thereby obtaining an output. This output is supplied to the display portion 3. Further, the motion estimation portion (101) can be achieved with using the prior art mentioned above, as it is. Details of the up-raters (103) and (104), the π/2 phase shifters (106) and (108), and the aliasing component removal portion (117) will be mentioned later.

Figure 4A:
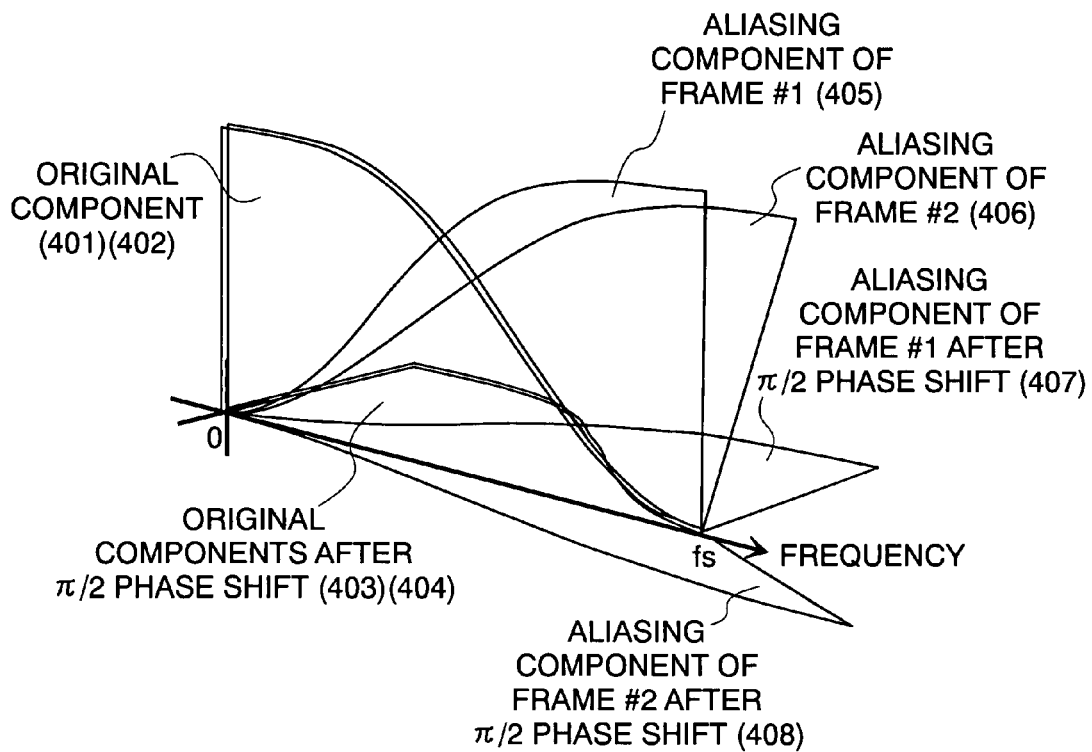
FIGS. 4(a) to 4(c) are views for explaining the operations in the first embodiment, according to the present invention.
Figure 4B:
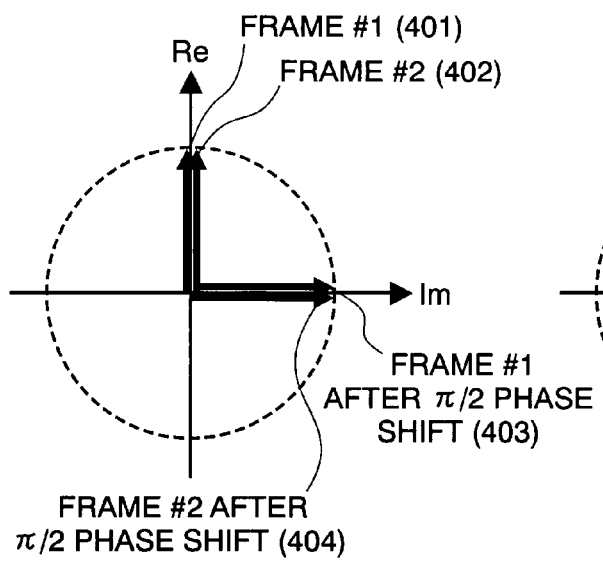
Figure 4C:
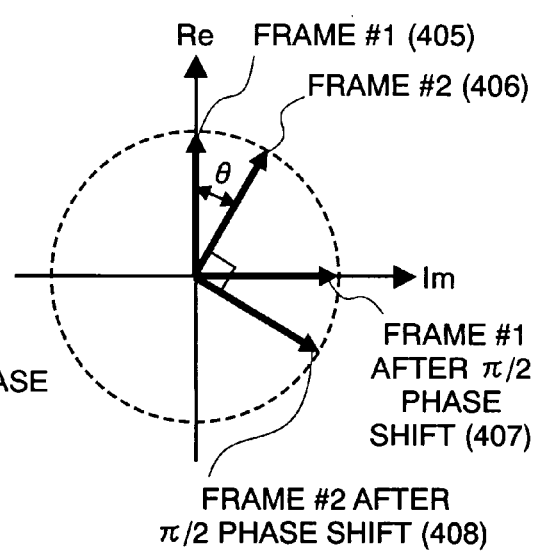

FIGS. 4(a) to 4(c) shows operations of the first embodiment of the present invention. Those figures show the respective outputs of the retarders (105) and (107) and the π/2 phase shifters (106) and (108), which are shown in FIG. 1, within one-dimensional frequency region thereof. In FIG. 4(a), each of the signals of frames #1 and #2 comes to be that obtained by adding an original component (401) or (402) and aliasing component (405) or (406), each of which is aliased from the original sampling frequency (fs). In this instance, the aliasing component (406) is rotated by the phase difference θ (102) mentioned above. On the other hand, each of the signals of frames #1 and #2, after the up-rating, which are outputted from the π/2 phase shifters (106) and (108), comes to be that obtained by adding the original component (403) or (404) after the π/2 phase shifting and the aliasing component (407) or (408), after the π/2 phase shifting. FIGS. 4(b) and 4(c) show the original components and the aliasing components, respectively, extracting them, for the purpose of easy understanding of phase relationships for each of the components shown in FIG. 4(a). Herein, if taking a weighed sum while determining the coefficients to be multiplied with each of the components, so that the component on Re axis be 1 and the component on Im axis be 0, when taking a vectorial sum of the four (4) components shown in FIG. 4(b), and also both components on the Re axis and the Im axis be 0 when taking a vectorial sum of the four (4) components shown in FIG. 4(c), then it is possible to extract only the original component with canceling the aliasing component therefrom. Thus, a video signal processing apparatus can be obtained for achieving the high resolution 2 times in the one-dimensional direction, with using only two (2) pieces of frame pictures. Details of the method for determining the coefficients will be mentioned later.

Figure 5:
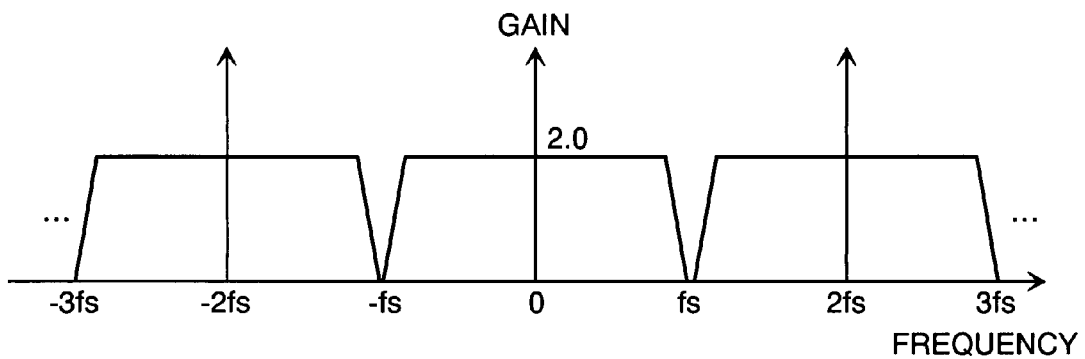
FIG. 5 is a view for explaining the first embodiment, according to the present invention.

FIG. 5 shows the operations of the up-raters (103) and (104) to be applied within the first embodiment, according to the present invention. In this FIG. 5, the horizontal axis shows the frequency and the vertical axis the gain (i.e., a value of ratio on an amplitude of the output signal to that of the input signal), i.e., the "frequency-gain" characteristics of the up-raters (103) and (104). Herein, within the up-raters (103) and (104), the high densification can be achieved by inserting a sampling point (=zero point) for a new pixel, at just middle position of the distance between the original pixels, while applying the frequency being two (2) times high (2fs) with respect to the sampling frequency (fs) of the original signal as a new sampling frequency, and also applying such a filter having bandwidth for passing through all the frequencies from −fs to +fs at gain 2.0. In this instance, as is shown in the FIG. 5, a characteristic can be obtained, repeating at every frequency of n×2fs (n: an integer), due to the symmetry of the digital signal.

Figure 6:
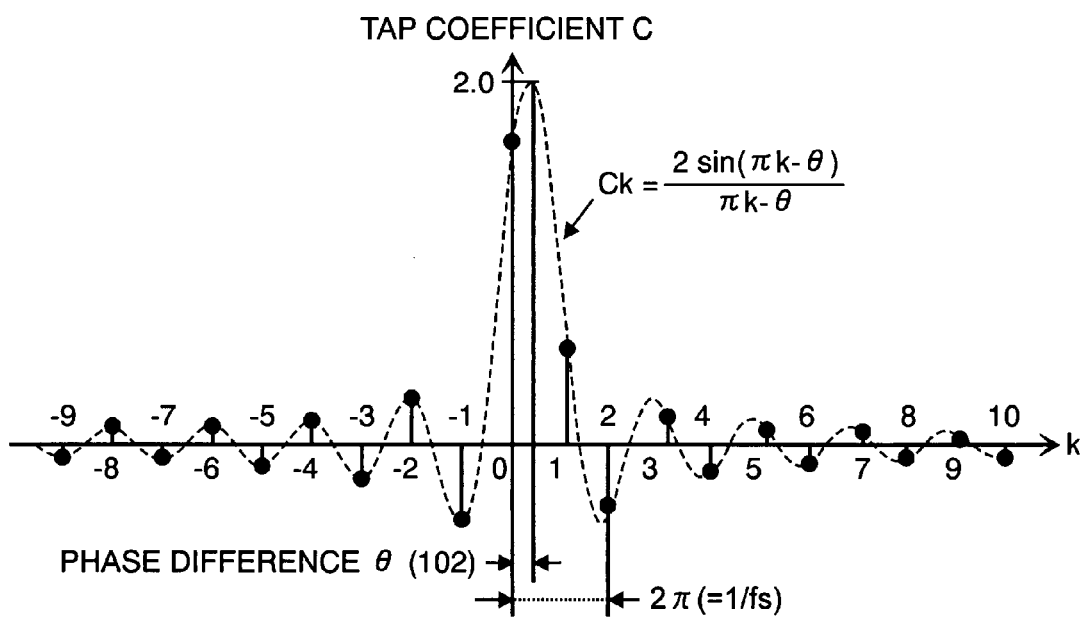
FIG. 6 is a view for explaining the first embodiment, according to the present invention.

FIG. 6 shows the details of the up-raters (103) and (104) to be applied in the first embodiment of the present invention. This FIG. 6 shows tap coefficients of the filter, which can be obtained through the Fourier transformation of the frequency characteristics shown in FIG. 5. In this instance, each the tap coefficient Ck (however, k is an integer) becomes a sinc function, which is well-known in general, and it comes to be Ck=2 sin(πk−θ)/(πk−θ) by taking the phase difference θ (102) of each pixel into the consideration. However, in the up-tater (103), it is enough to make Ck=2 sin(πk)/(πk) by putting the phase difference θ (102) into 0. Also, by expressing the phase difference θ (102) by the phase difference of a an integer pixel unit (2π)+the phase difference of a decimal pixel unit, it is possible to achieve the compensation upon the phase difference of integer pixel unit through a simple pixel shifting while using filters of the up-raters (106) and (108) mentioned above for compensation upon the phase difference of the decimal pixel unit.

Figure 7A:
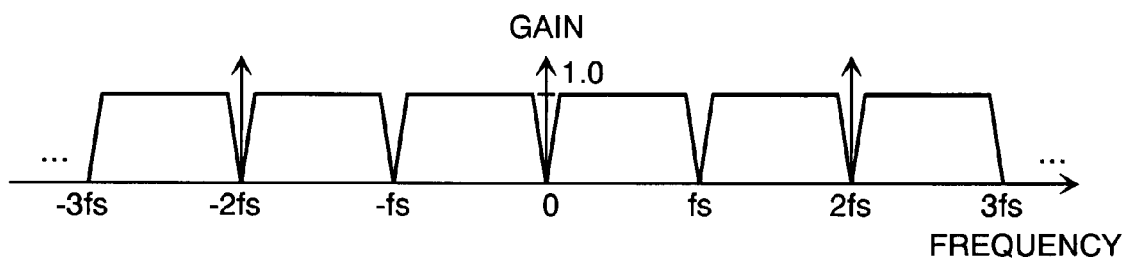
FIGS. 7(a) and 7(b) are views for explaining the first embodiment, according to the present invention.
Figure 7B:
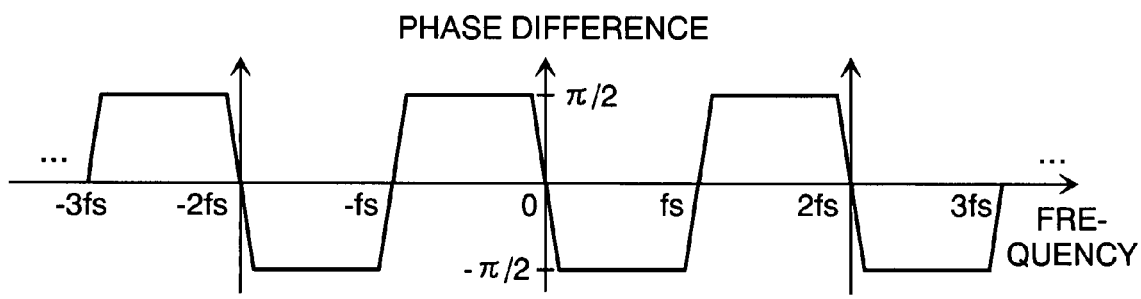

FIGS. 7(a) and 7(b) show examples of the operations of the π/2 phase shifters (106) and (108) to be applied in the first embodiment of the present invention. As the π/2 phase shifters (106) and (108), it is possible to use the Hilbert Transformers (106) and (108) which are well known in general. In FIG. 7(a), the horizontal axis shows the frequency while the vertical axis the gain (i.e., a value of ratio on an amplitude of the output signal to that of the input signal), i.e., the "frequency-gain" characteristics of the Hilbert Transformers. Herein, within the Hilbert Transformers, applying the frequency being two (2) times high (2fs) with respect to the sampling frequency (fs) of the original signal as a new sampling frequency, and having a bandwidth at gain 1.0 for all the frequency components, except for 0 between −fs and +fs. Also, in FIG. 7(b), the horizontal axis shows the frequency while the vertical axis the phase difference (i.e., the difference in the phase of an output signal with respect to the phase of an input signal), and it represents the "frequency-gain" characteristics of the Hilbert Transformers. Herein, the frequency component between 0 and fs is delayed in the phase by only $\pi/2$, while the frequency component between 0 and −fs is advanced in the phase by only $\pi/2$. In this instance, as is shown in the figures, a characteristic can be obtained, repeating at every frequency of n×2fs (n: an integer), due to the symmetry of the digital signal.

Figure 8:
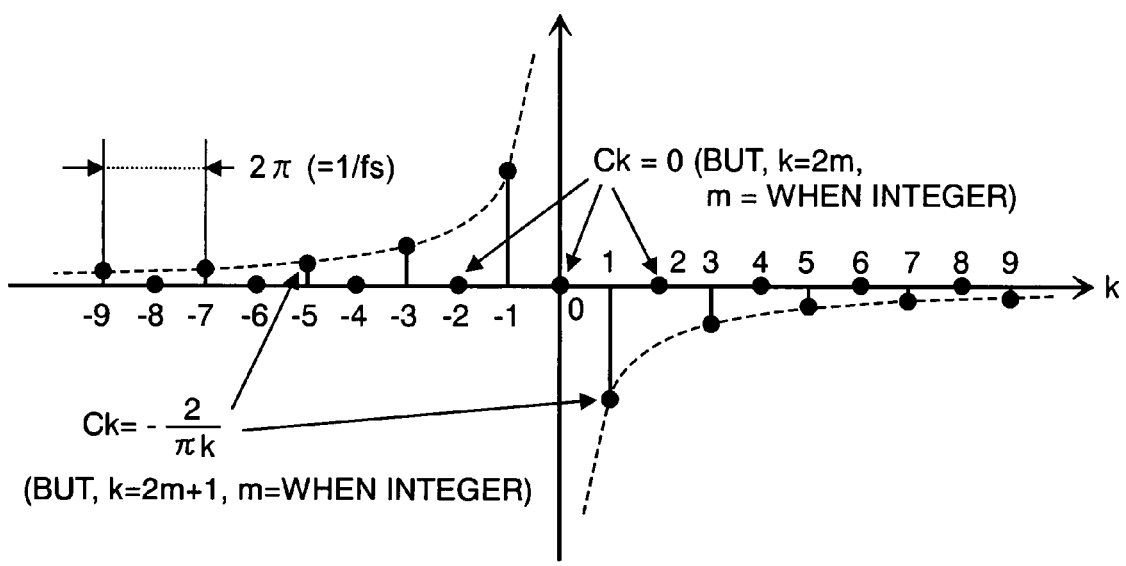
FIG. 8 is a view for explaining the first embodiment, according to the present invention.

FIG. 8 shows an example of constructing the $\pi/2$ phase shifters (106) and (108), to be applied in the first embodiment of the present invention, with the Hilbert Transformers. The same figure shows tap coefficient of a filter, which can be obtained through the Fourier inversion of the frequency characteristics shown in FIGS. 7(a) and 7(b). In this instance, it is enough to make each the tap coefficient Ck=0 when k=2m (however, m is an integer), or Ck=−2/($\pi$k) when k=2 m+1.

However, as the $\pi/2$ phase shifters (106) and (108), to be applied in the first embodiment of the present invention, it is also possible to apply differentiators. In this case, when differentiating general equation $\cos(\omega t+\alpha)$ by t and multiplying by $1/\omega$, then $d(\cos(\omega t+\alpha))/dt*(1/\omega))=-\sin(\omega+\alpha)=\cos(\omega t+\alpha+\pi/2)$, i.e., it is possible to achieve the function of $\pi/2$ phase shifting. Thus, it is also possible to obtain the $\pi/2$ phase shifting function by applying a filter having $1/\omega$ "frequency-amplitude" characteristic after taking the difference between the value of pixel to be target and that of the pixel neighboring thereto.

FIGS. 9(a) to 9(d) show the operations of the coefficient determining portion (109) to be applied in the first embodiment of the present invention and the details thereof. As is shown in FIG. 9(a), if determining the coefficients to be multiplied with each component in such a manner that the component on the Re axis be 1 while the component on the Im axis 0 when obtaining the vectorial sum of the four (4) components shown in FIG. 4(b), as well as, both components on the Re axis and the Im axis be 0 when obtaining the vectorial sum of the four (4) components shown in FIG. 4(c), then it is possible to achieve the video signal processing apparatus enabling to obtain the high resolution of two (2) times in the one-dimensional direction with using only two (2) pieces of the frame pictures. As shown in FIG. 1, when satisfying the condition shown in FIG. 9(a), by making the coefficient C0 to the output of the retarder (105) (i.e., sum of the original component and the aliasing component of the frame #1 after the up-rating), the coefficient C1 to the output of the $\pi/2$ phase shifter (106) (i.e., sum of results of the $\pi/2$ phase shifting on each the original component and the aliasing component of the frame #1 after the up-rating), the coefficient C3 to the output of the Hilbert Transformer (106) (i.e., sum of results of the $\pi/2$ phase shifting on each the original component and the aliasing component of the frame #2 after the up-rating), then simultaneous equations can be obtained as shown in FIG. 9(b) from the phase relationships of the respective components shown in FIGS. 4(b) and 4(c), and then dissolving those equations can lead the result as shown in FIG. 9(c). It is enough, for the coefficient determining portion (109), to output the coefficients C0, C1, C2 and C3, in this manner. As an example, the values of the coefficients C0, C1, C2 and C3 are shown in FIG. 9(d), when changing the phase difference $\theta$ (102) from 0 to $2\pi$ every $\pi/8$. This corresponds to the case when conducting motion estimation upon a signal of the original frame #2 with accuracy of 1/16 pixel, and thereby conducting the motion compensation upon the frame #1.

However, the up-raters (103) and (104) and the $\pi/2$ phase shifters (106) and (107) necessitate an infinity number of taps for obtaining an ideal characteristics thereof, however there is no problem from a practical viewpoint if simplifying them by cutting the number of taps down to a finite number of taps. In this instance, it is possible to apply a general window function (such as, a hanning window function and a hamming window function, for example). By bringing the coefficients for each of taps of the simplified Hilbert Transformer into values, being bilaterally symmetric around CO, i.e., C(−k)=−Ck (k: an integer), it is possible to shift the phase by a predetermined amount.

By constructing each portion as was mentioned above, it is possible to achieve the high resolution with less number of frames and also with simplified structures thereof.

Embodiment 2

Figure 10:
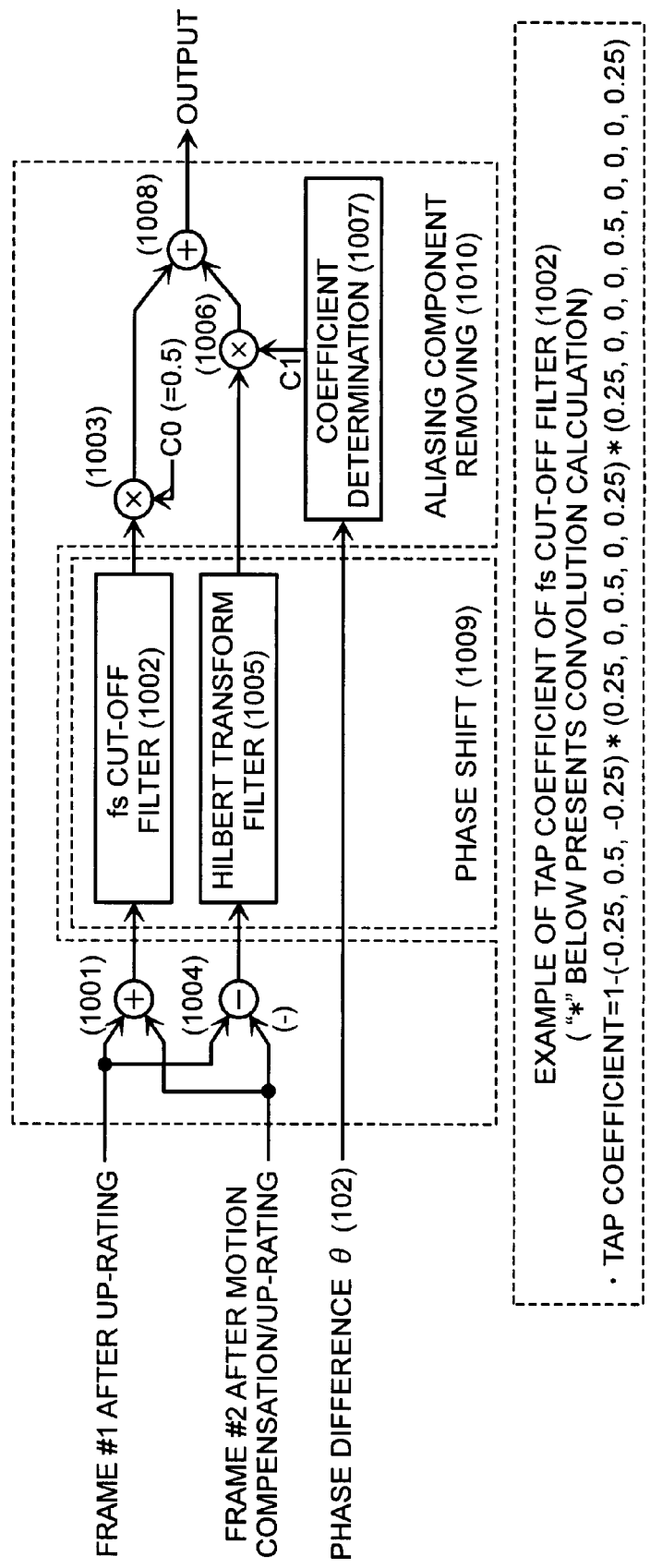
FIG. 10 is a view for explaining a second embodiment, according to the present invention.

FIG. 10 shows a second embodiment according to the present invention. The structures shown in this figure are obtained by simplifying the structures shown in FIG. 1, with using the relationship among the coefficients C0, C1, C2 and C3 shown in FIG. 9(c). Thus, since C0=C2=½ and C1=−C3=−(1+cos $\theta$)/2 sin $\theta$, the signals of sum and difference are produced by means of an adder (1001) and a subtracter (1004), from the frame #1 and the frame #2 after the motion compensation and up-rating. With the sum signal, after passing through a fs cut-off filter (1002), it is inputted into an adder (1008) with multiplying by C0 (=0.5) within a multiplier (1003). Herein, the fs cut-off filter (1002) is for cutting off the components of the sampling frequency (fs) before up-rating as a zero point, and it can be achieved by using the tap coefficients shown in (1011) of FIG. 10, for example. The propose of providing this fs cut-off filter (1002) lies to prevent unnecessary component of frequency fs from remaining, since the aliasing component cannot be removed from, because the gain comes down to zero point at the frequency fs on the "frequency-gain" characteristics of the Hilbert Transformer (1005), as shown in FIG. 7(a). Accordingly, if applying a means for enabling $\pi/2$ phase shifting, including the component of frequency fs, in the place of the Hilbert Transformer (1005), then this fs cut-off filter (1002) is unnecessary.

On the other hand, the difference signal, after being shifted in the phase by a predetermined amount (=$\pi/2$) within the Hilbert Transformer (1005), is multiplied by the coefficient C1, which is determined upon basis of the phase difference (102) within a coefficient determining portion (1007), within the adder (1008), thereby obtaining an output. Herein, a phase shift portion (1009), comprising the retarder (1002) and the Hilbert Transformer (1005), can be achieved with a circuit scale being half (½) of the phase shift portion (116) shown in FIG. 1. Also, it is enough for the coefficient determining portion (1007) to output the coefficient C1 shown in FIG. 9(c), then an aliasing component removal portion (1010), including the adder (1001), the subtracter (1004), the multipliers (1003) and (1006), the adder (1008) and the coefficient determining portion (1007), can be reduced of the number of pieces of the multipliers, and therefore it can be achieved with the circuit scale being smaller than that of the aliasing component removal portion (117) shown in FIG. 1.

Embodiment 3

Figure 11:
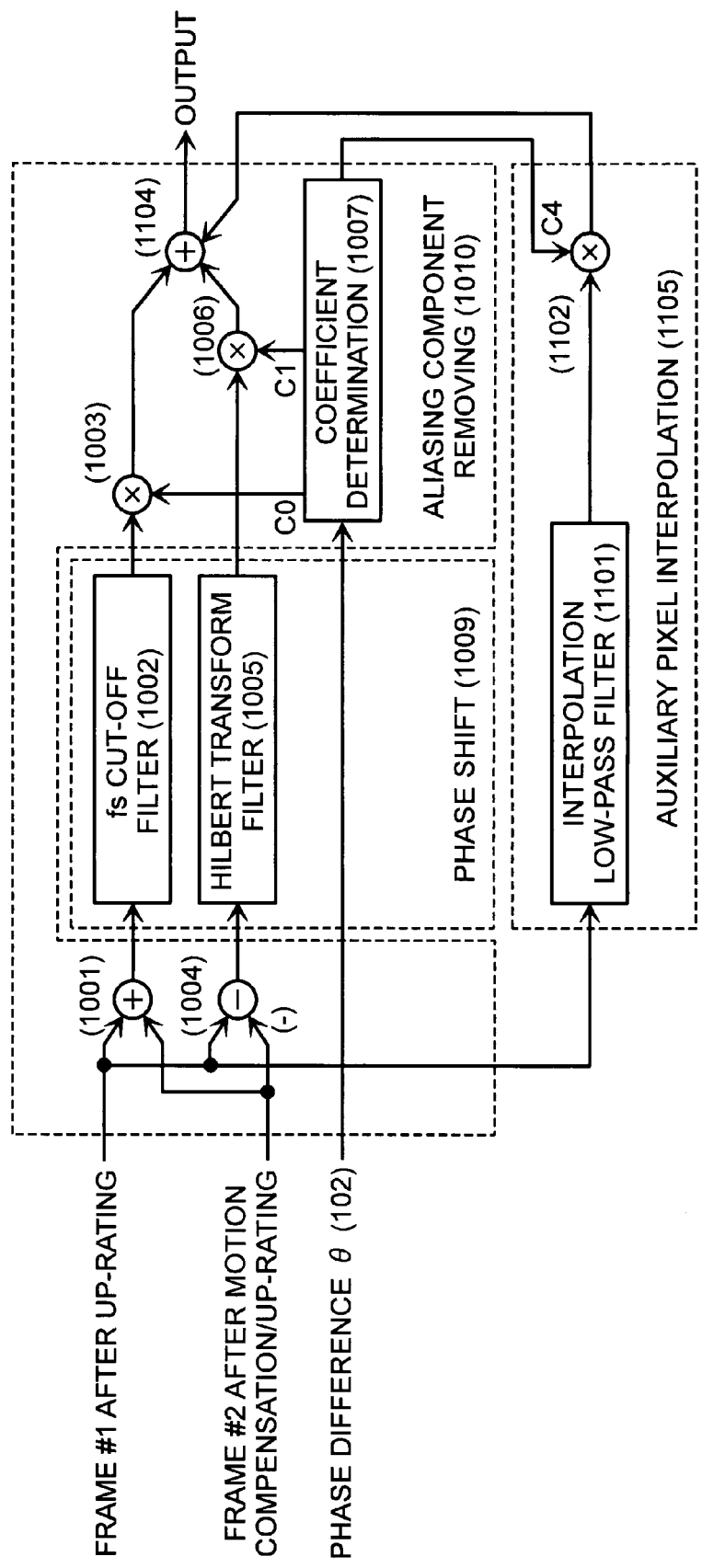
FIG. 11 is a view for explaining a third embodiment, according to the present invention.

FIG. 11 shows a third embodiment according to the present invention. The structures shown in this figure is constructed upon basis of the structures shown in FIG. 10, enabling to change an output from an auxiliary pixel compensation portion (1105) when the phase difference θ comes close to zero (0), for the purpose of preventing the coefficients C1 and C3 from becoming unstable when the phase difference θ is zero (0), as shown in FIG. 9(d), and/or preventing the coefficients C1 and C3 from becoming weak against noises due to becoming large as the phase difference θ comes close to zero (0). Thus, a general interpolation low-pass filter (1101) is prepared as a bypass route, while C4 is newly produced other than the above-mentioned coefficients C0 and C1 within the coefficient determining portion (1103), and an output of the interpolation low-pass filter (1101) is multiplied by the coefficient C4 within the multiplier (1102), and thereafter it is outputted after being added onto the signal of high resolution within the adder (1104). Other structures than those are same to those shown in FIG. 10.

Figure 12:
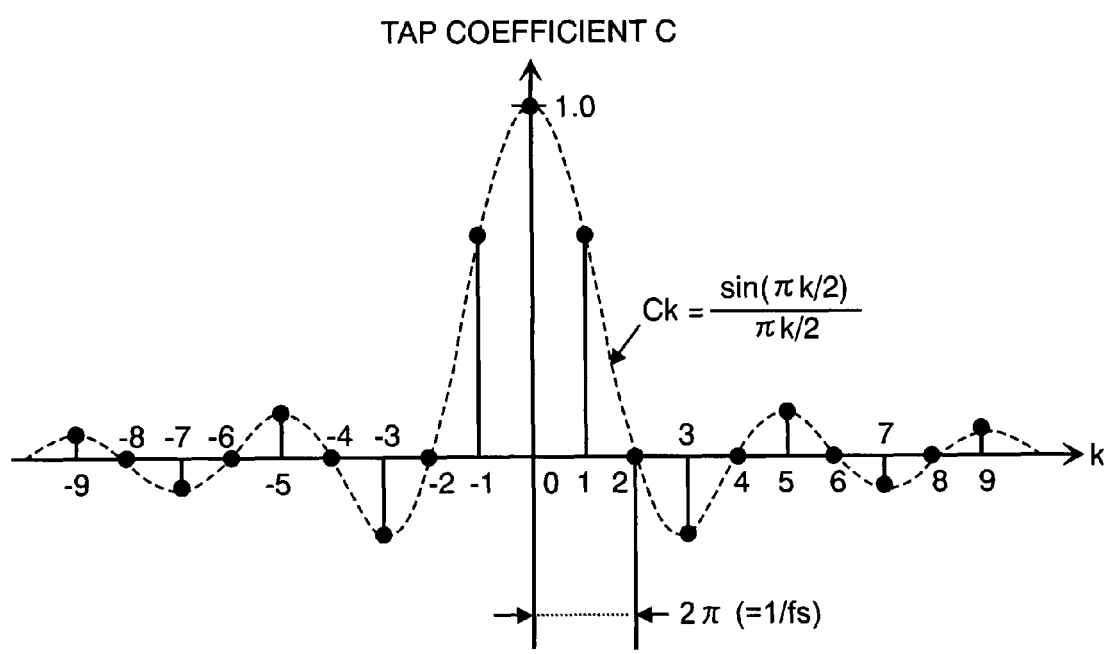
FIG. 12 is a view for explaining the third embodiment, according to the present invention.

FIG. 12 shows a detailed example of the interpolation low-pass filter (1101) to be applied in the third embodiment, according to the present invention. This FIG. 12 shows the tap coefficients of filters obtained through the Fourier inversion of the frequency characteristics, taking a half (½) of the original sampling frequency fs as the cut-off frequency. In this instance, each of the tap coefficients Ck (however, k: an integer) comes to be a general sinc function, and therefore it is enough to put Ck=sin(πk/2)/(πk/2). FIG. 13 shows the detailed example of the coefficient determining portion (1103) to be applied into the third embodiment of the present invention. In this figure is shown operation of, although the new coefficient C4 is usually zero (0) upon basis of the coefficients C0 and C1 shown in FIG. 9(d), however setting values of the coefficients C0 and C1 to zero (0), compulsively, when the phase difference θ comes close to zero (0), as well as, setting the value of the coefficient C4 to 1.0. With this operation, in the structures shown in FIG. 11, it is possible to change an output of the adder (1104) to an output of the interpolation low-pass filter (1101), automatically, when the when the phase difference θ (102) comes close to zero (0). However, it is also possible to change the coefficients from those shown in FIG. 12 to those shown in FIG. 13, continuously, accompanying with approaching of the difference θ to zero (0). Also in case when determining that the pixel corresponding to the pixel as the processing target on the frame #1 does not lie on the frame #2, it is possible to change the output of the adder (1104) to an output of the interpolation low-pass filter (1101), automatically, by controlling the respective coefficients, in the similar to that when the phase difference θ (102) comes close to zero (0).

Embodiment 4

Figure 14:
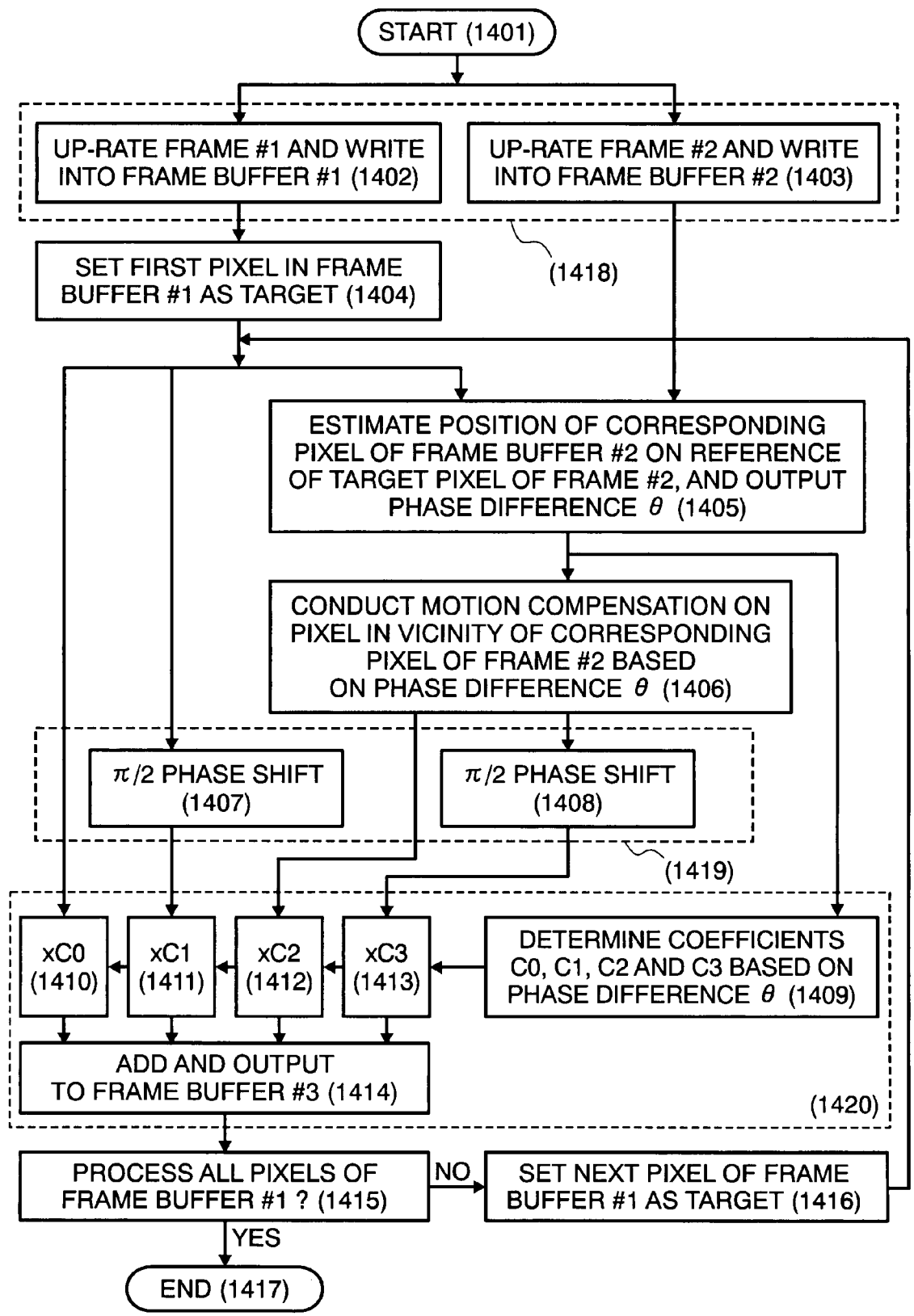
FIG. 14 is a view for explaining a fourth embodiment, according to the present invention.

FIG. 14 shows a fourth embodiment according to the present invention. This figure shows an embodiment of achieving the same operations as the embodiment 1 mentioned above, but through software program. In this figure, the processing starts from a step (1401), and the video data of each of the frames are up-rated up to two (2) times in a step (1418). Thus, in a step (1402) is up-rated the video data of the frame #1 to be written into a frame buffer #1, and in a step (1402) is up-rated the video data of the frame #2 to be written into a frame buffer #2. Herein, the up-rating can be achieved by writing data for every second pixel after once clearing values of each of the frame buffers to zero (0).

Next, in a step (1404), the first pixel (for example, the pixel at the upper left) of the frame buffer #1 is set to be the processing target, and then the processing is looped until the processing is completed upon all the pixel data with respect to the frame buffer #1.

In a step (1405), estimation is made on a position of the corresponding pixel within the frame buffer #2, upon basis of the target pixel of the frame buffer #1, thereby outputting the phase difference θ. In this instance, as the method for estimating the position of the corresponding pixel can be applied the conventional technology mentioned above, as it is.

In a step (1406), upon basis of the phase difference θ obtained in the step (1405), motion compensation is conducted upon the pixels in the vicinity of the corresponding pixel within the frame buffer #2. In this instance, as the pixels in the vicinity thereof, the compensation may be made on the video data to be used in the process of π/2 phase shifting in a step (1408), i.e., only the pixel data within a region where the infinite tap number acts. The operation of this motion compensation is same to that explained by referring to FIGS. 5 and 6.

Following to the above, in a step (1419) is conducted phase shifting by a predetermined amount upon the frame buffer #1 and the frame buffer #2, on which the motion compensation is made. Thus, in the steps (1407) and (1408), the pixel data within each of the frame buffers is shifted in the phase thereof by π/2.

Following to the above, in a step (1420), the pixel data of the frame buffers #1 and #2 are removed the aliasing components thereof, upon basis of the phase difference θ, to be outputted to a frame buffer #3. Thus, in a step (1409), the coefficients C0, C1, C2 and C3 are determined upon basis of the phase difference θ, and are multiplied with the pixel data of the frame buffers #1 and #2 and the data after the π/2 phase shifting, respectively, in the steps (1410), (1411), (1412) and (1413), and thereafter all of them are added to be outputted to the frame buffer #3. The operation of removing the aliasing component is same to that explained by referring to FIG. 9 in the above.

Following to the above, in a step (1415), determination is made on whether the processing is completed or not on all pixels of the frame buffer #1. If determining that it is not completed, after setting the next pixel (for example, the pixel at the right-hand neighbor) as the processing target in a step (14.16), the process turns back to those in the steps (1405) and thereafter. On the other hand, if determining that it is completed, the process is ended in a step (1417).

With such the processing as was mentioned above, it is possible to output a high-resolution signal to the frame buffer #3. In case when applying to the moving picture, it is enough to repeat the processes starting from the step (1401) and reaching to the step (1417).

Embodiment 5

FIG. 15 shows a fourth embodiment according to the present invention. This figure shows an embodiment of achieving the same operations as the embodiment 2 mentioned above, but through software program. In this figure, the processing starts from a step (1501), and the video data of each frame are up-rated in a step (1518). Thus, in a step (1502) is up-rated the video data of the frame #1 to be written into the frame buffer #1, and in a step (1503) is up-rated the video data of the frame #2 to be written into a frame buffer #2. Herein, the up-rating can be achieved by writing data for every second pixel after once clearing values of each of the frame buffers to zero (0).

Next, in a step (1504), the first pixel (for example, the pixel at the upper left) of the frame buffer #1 is set to be the processing target, and then the processing is looped until the processing is completed upon all the pixel data with respect to the frame buffer #1.

In a step (1505), estimation is made on a position of the corresponding pixel within the frame buffer #2, upon basis of the target pixel of the frame buffer #1, thereby outputting the phase difference θ. In this instance, as the method for estimating the position of the corresponding pixel can be applied the conventional technology mentioned above, as it is.

In a step (1506), upon basis of the phase difference θ obtained in the step (1405), motion compensation is conducted upon the pixels in the vicinity of the corresponding pixel within the frame buffer #2. In this instance, as "the pixels in the vicinity" thereof, the compensation may be made on the video data to be used in the process of the Hilbert Transform in a step (1510), i.e., only the pixel data within a region where the infinite tap number acts. The operation of this motion compensation is same to that explained by referring to FIGS. 5 and 6.

Following to the above, in a step (1520), the pixel data of the frame buffers #1 and #2 are removed the aliasing components thereof, upon basis of the phase difference θ, and are outputted to the frame buffer #3. First, in a step (1507), the value of the pixel data in the frame buffer #1 and the value of the pixel data in the frame buffer #2, upon which the motion compensation is made, are added, and are cut off the components of frequency fs in a step (1509). The function of this fs cut-off filter (1509) is same to that (1002) shown in FIG. 10.

Also, in a step (1508), the value of the pixel data in the frame buffer #2, upon which the motion compensation is made, is subtracted from the value of the pixel data in the frame buffer #1. Herein, upon the result of that subtraction is made the phase shifting by a predetermined amount, in a step (1519). Thus, in the similar manner, also with using the data in vicinity of the subtraction, the Hilbert Transformation is conducted in a step (1510). The operation of this phase shifting is same to that explained by referring to FIGS. 7 and 8 mentioned above.

Following to the above, the data after the addition mentioned above is multiplied by the coefficient C0 (=0.5) in a step (1511), as well as, the coefficient C1 is determined upon basis of the phase difference θ. In a step (1513), the coefficient C1 and the data after the Hilbert Transformation are multiplied, and thereafter both data are added in a step (1514) to be outputted into the frame buffer #3. The operation of removing the aliasing component is same to that explained by referring to FIG. 10.

Following to the above, in a step (1515), determination is made on whether the processing is completed or not upon all pixels of the frame buffer #1. If it is not yet completed, after setting the next pixel (for example, the pixel at the right-hand neighbor), the process turns back those steps (1505) and thereafter, on the other hand, if it is completed, the process is ended in a step (1517).

With such the processing as was mentioned above, it is possible to output a high-resolution signal to the frame buffer #3. In case when applying to the moving picture, it is enough to repeat the processes starting from the step (1501) and reaching to the step (1517).

Embodiment 6

FIG. 16 shows a sixth embodiment according to the present invention. This figure shows an example of achieving the same operation as the third embodiment mentioned above, but through software program. The processing steps and the operations shown in this figure are made, so that a processing result of a step (1606) is outputted into the frame buffer #3 when the phase difference θ comes close to zero (0), upon basis of the processing steps shown in FIG. 15, for the purpose of preventing the coefficients C1 and C3 from becoming unstable when the phase difference θ is zero (0), as shown in FIG. 9(d), and/or preventing the coefficients C1 and C3 from becoming weak against noises due to becoming large as the phase difference θ comes close to zero (0). Thus, the coefficients C0, C1 and C4 are determined upon basis of the phase difference θ in a step (1601), and a general interpolation low-pass filtering process is conducted with using the pixel data as target within the frame buffer #1 and the pixel data in the vicinity thereof, in a step (1602). Thereafter, multiplication is made by the coefficient C4 in a step (1603), and then addition is made with the outputs of the steps (1511) and (1513) in a step (1604), thereby to be outputted into the frame buffer #3. Others than those are same to the operations shown in FIG. 15. Further, the operation of determining the coefficients in the step (1601) is same to that explained by referring to FIG. 13 mentioned above. Also, the operation of the interpolation low-pass filter in the step (1602) is same to the operation explained by referring to FIG. 12 mentioned above.

Since hardware for functioning the processing steps shown in FIGS. 14, 15 and 16 mentioned above can be obtained, easily, with a general video processing equipment and a computer, etc., which is constructed with a signal input/output portion (I/O), a CPU (Central Processing Unit) and a signal processing LSI, such as, DSP (Digital Signal Processor), and frame buffers (memory).

With such technology as mentioned above, it is possible to obtain the video signal processing for achieving the 2-times high resolution in the one-dimensional direction, if there is at least two (2) pieces of frame pictures.

Differences will be explained, in particular, in the operations between the present invention and the conventional technology mentioned above, by referring to FIGS. 17(a) to 17(c). In FIG. 17(a), among frames from a frame #1 (1701) to a frame #5 (1705), input pictures are prepared such that an object to be photographed moves into the right-hand direction. In this instance, as is shown in FIG. 17(b), the object is shifted, intentionally, in such a manner that the position of corresponding pixels shifts by ¼ pixel (=π/2) between the frame #1 (1701) and the frame #2 (1702), by 1 pixel (=2π) between the frame #1 (1701) and the frame #3 (1703), by 5/4 pixel (=5π/2) between the frame #1 (1701) and the frame #4 (1704), and by 2 pixel (=4π) between the frame #1 (1701) and the frame #5 (1705), respectively, judging from the sampling phases of the respective frames. In this instance, the phases of the respective aliasing components can be presented as shown in FIG. 17(c), upon basis of the phase of the aliasing components contained in the signals on the frame #1 (1701). In case when conducting the 2-times high resolution upon this input picture (a), according to the conventional technology, since the vectorial sum of the aliasing components cannot be made zero (0) even with using any three (3) pieces of frames within the frames #1 (1701) to #5 (1705), therefore it is impossible to achieve the high resolution. On the other hand, with applying the present embodiment, since the vectorial sum of the aliasing components can be made zero (0) with two (2) pieces of frames neighboring to each other (for example, the frame #1 (1701) and the frame #2 (1702), it is possible to achieve the high resolution. Thus, with using the input picture shown in FIG. 17(*a*) as a test patter, it is possible to confirm the operation condition of the present embodiment.

Embodiment 7

Although the explanation was made on the 2-times high resolution with using two (2) pieces of frames in the above, however n-times high resolution can be achieved by using the signals of n pieces of frames (n: an integer larger equal to or larger than two (2)). In this instance, as was shown in FIG. 9(*a*) mentioned above, under the condition that the Re axis of sum of the original components=1 and the Im axis of sum of the original components=0, it is enough to dissolve simultaneous equations while putting the vectorial sum of (n−1) pieces of the aliasing components zero (0), each being aliased from the frequency being high 1−(n−1) times as the original sampling frequency (fs). Hereinafter, detailed explanation will be made on the above, by referring to FIGS. 18 and 19(*a*) and 19(*b*).

In FIG. 18 is shown an embodiment of an apparatus for achieving the n-times high resolution with using n pieces of frames (n: an integer equal to or larger than two (2)). In this figure, first of all, estimation is made on the positions of the corresponding pixels on the frame #2 to the frame #n inputted, on a criterion of the sampling phase (or the sampling position) of the pixel of the processing target on the frame #1 inputted, thereby obtaining the phase differences θ1 (1802-1) to Θ(n−1)) (1802-(*n*−1)). Next, by up-raters (1803-0) to (1803-(*n*−1)) of a motion compensation/up-rate portion (1806), motion compensation is conducted on the frame #2 through the frame #n with using the information of each of the phase differences θ, so as to fit the position thereof to that of the frame #1, and at the same time, the pixel numbers of the respective frames are increased up to n-times, respectively, and thereby obtaining the high resolution. In a phase shift portion (1807), the phase of this data of high resolution is shifted by a predetermined amount, thereby obtaining Si0 to Si(n−1). Herein, as a means for shifting the phase of data by the predetermined amount, it is possible to apply π/2 phase shifters (1805-0) to (1805(*n*−1)). Also, for compensating the delay caused in each of the π/2 phase shifters, signals of the respective frames of high resolution are delayed by the retarders (1804-0) to (1804(*n*−1)), thereby obtaining signals Sr0 to Sr(n−1). In an aliasing component removal portion (1808), computation is made for removing the aliasing components with using those signals Si0 to Si(n−1) and Sr0 to Sr(n−1) and the phase differences θ1−θ(n−1), thereby obtaining an output. However, in a motion estimation portion (1801) can be implemented with using the conventional technology mentioned above as it is. Also, with the motion compensation/up-rate portion (1806) and the phase shift portion (1807), since they can be easily inferred and obtained by changing the frequency in the figure from fs to fs*n/2, therefore they are omitted to be shown in the figure. However, in case when the aliasing distortion cannot be removed because the gain of frequency fs*n/2 comes to zero point, it is preferable to apply a cut-off filter of making the gain of frequency fs*n/2 zero point. This cut-off filter may be inserted at the position of the retarders (1804-0) to (1804(*n*−1), however it is apparent that similar effect can be obtained by inserting it at the position of an output of the aliasing component removal portion (1808).

FIGS. 19(*a*) and 19(*b*) show the details of operations of the aliasing component removal portion (1808). In FIG. 19(*a*) is shown an equation for obtaining an output, being removed the aliasing components thereof by using the signals Si0 to Si(n−1) and Sr0 to Sr(n−1) and the phase differences θ1−θ(n−1). Herein, Ci0 to Ci(n−1) and Cr0 to Cr(n−1) are coefficients to be multiplied onto the Si(n−1) and Sr0 to Sr(n−1), respectively.

In FIG. 19(*b*) are shown an equation for obtaining those coefficients Ci0 to Ci(n−1) and Cr0 to Cr(n−1). The equation is in the from of the matrix format, on both the left side and the right side, and at every second line from the above, there are shown the original component, the component of the sampling frequency (fs), and the 2 times component of the sampling frequency (fs), and in the same manner, are shown the components until (n−1) times of the sampling frequency (fs). At every first line (i.e., an odd number line) is shown the component of the Re axis, and at every second line (i.e., an even number line) the component of the Im axis, respectively. The matrix at the left side of the same equation indicates that the sum of the original components on the Re axis is 1, and that all of the other components are 0. The right side of the same equation is made of the product calculation. In the matrix on the left of the right side, every second column from the left indicates that the vector having length 1 is rotated depending on the sampling phase (reference) and the sampling phase difference between the frame #2 and the frame #1, and hereinafter, in the same manner, depending on the frame #n and the sampling phase difference of the frame #1. Every first column (i.e., an odd number column) shows a value obtained by projecting the vector of length 1 onto the Re axis, and every second column (i.e., an even number column) a value obtained by projecting the vector of length 1 onto the Im axis, respectively. Herein, every second line from the above has a feature that the sampling phase difference (i.e., a rotation angle) becomes large in proportion to the sampling frequency. The matrix at the right of the right side is the coefficient to be obtained. Thus, the equation shown in FIG. 19(*b*) shows that vector sum is taken after multiplying each component of the frame #1 to the frame #n by an appropriate coefficient, for extracting only the Re axis of the original component while removing the aliasing component. Accordingly, by obtaining the coefficients Ci0 to Ci(n−1) and Cr0 to Cr(n−1) through the reverse matrix calculation shown in FIG. 19(*b*) and calculating the equation with putting those coefficients into FIG. 19(*b*), it is possible to remove the unnecessary (n−1) pieces of aliasing components, and thereby achieving the n-times high resolution. In this instance, when putting n=2, the configuration shown in FIG. 18 coincides with that shown in FIG. 1, and the equations shown in FIGS. 19(*a*) and 19(*b*) with those shown in FIGS. 9(*a*) to 9(*d*). Also, in the similar manner, the number of the input frames, which are shown in the embodiments (i.e., the flowcharts) shown in FIGS. 14, 15 and 16, can be extended, easily, from 2 to n, and therefore illustration of a flowchart corresponding to the n-times high resolution is omitted herein.

Further, the explanation was made by listing up the high resolution in the horizontal direction, as an example, in the above; however, the present invention should not be restricted to this, but it can be also applied into the high resolution into the vertical direction and an oblique direction. For example, with application of the present invention into an interlace-progressive scanning conversion (i.e., I-P conversion), it is possible to produce one (1) piece of frame picture from two (2) pieces of the field pictures. Thus, with application of the present, with considering the field pictures as a "frame picture having ½ number of scanning lines", it is possible to obtain an output picture having 2-times number of scanning lines (i.e., 2-times resolution in the vertical direction) per one (1) piece of picture, irrespective of difference between the still picture and the moving picture. Also, the present invention can be extended, easily, for obtaining the two-dimensional high resolution combining into the horizontal and vertical directions.

Further, in the embodiments mentioned above, the explanation was made on the example of the video displaying apparatus, as the video signal processing apparatus; however, the present invention should not be restricted to this, and is applicable into, such as, a DVD player and a HDD player, etc., for example, in the same manner, and it is also needless to say that the present invention can be applied further to a mobile video display terminal for receiving so-called a one-segment broadcast (i.e., territorial digital broadcast in Japan, for sending a program (simple moving picture) directing to a mobile telephone). Also, as the video frame may be used a video frame of signals other than the television broadcasting signal. Thus, the present invention can be applied, in the similar manner, such as, streaming picture, which is broadcasted through the Internet, or the picture reproduced from the DVD player or the HDD player, for example.

While we have shown and described several embodiments in accordance with our invention, it should be understood that disclosed embodiments are susceptible of changes and modifications without departing from the scope of the invention. Therefore, we don not intend to be bound by the details shown and described herein but intend to cover all such changes and modifications that fall within the ambit of the appended claims.

What is claimed is:

1. A video signal processing apparatus, comprising:
   an input portion, into which n pieces of video frames (n: an integer equal or larger than 2) are inputted; and
   a resolution converter portion, which is configured to obtain an output video frame with increasing a number of pixels building up the video frame, by composing the n pieces of said video frames inputted, wherein said resolution converter portion comprises:
      a motion estimation portion, which is configured to estimate a sampling phase difference with using video data on said input video frame as a reference and each video data on other input video frame;
      a motion compensation/up-rate portion, which is configured to compensate motion of the video data of the each input video frame with using information of said sampling phase difference, as well as, to increase the number of pixels to n times;
      a phase shift portion, which is configured to shift the video data of each of said video frames, the pixel number of which is increased, by a predetermined amount;
      a coefficient determining portion, which is configured to determine a coefficient with using information of said sampling phase difference; and
      an aliasing component removal portion, which is configured to remove (n−1) pieces of aliasing components, by adding each of video data in front and back of said phase shifting after multiplying said coefficient, thereby to provide an output.

2. The video signal processing apparatus, as described in the claim 1, wherein said resolution converter portion further comprises:
   an auxiliary pixel interpolation portion, which is configured to increase the video data of the input video frame through interpolation, wherein
   a result of said auxiliary pixel interpolation portion is outputted, in place of a result of removing said aliasing components, when the coefficient cannot be determined within said coefficient determining portion.

3. The video signal processing apparatus, as described in the claim 1, wherein said resolution converter portion produces a piece of video data by producing 2n pieces of data from the data of n pieces of video data, which are inputted from said input portion, multiplying said 2n pieces of data by the coefficients, respectively, and adding them.

4. The video signal processing apparatus, as described in the claim 3, wherein said 2n pieces of data are made of n pieces of data based on the data of the n pieces of video frames, which are inputted from said input portion, and n pieces of data based on the data of n pieces of video frames, which are obtained by shifting phases of data of the n pieces of video frames inputted from said input portion.

5. A video signal processing method, comprising the following steps of:
   inputting n pieces of video frames (n: an integer equal to or greater than two (2)); and
   composing said n pieces of video frames inputted, with increasing a number of pixels building up said video frame, and thereby obtaining an output video frame, wherein said step of obtaining the output video frame comprises steps of:
      estimating a sampling phase difference with using video data on said input video frame as a reference and each of corresponding video data on other input video frame;
      conducting motion compensation on the video data of the each input video frame with using information of said sampling phase difference, as well as, increasing a number of pixels thereof to n times;
      phase shifting the video data of the each video frame, the pixel number of which is increased, by a predetermined amount
      determining a coefficient with using said information of sampling phase difference; and
      removing (n−1) pieces of aliasing components by adding each of video data in front and back of said phase shifting after multiplying them by said coefficient.

6. The video signal processing method, as described in the claim 5, further comprising:
   an auxiliary pixel interpolation step of increasing the video data of the input video frame through a pixel interpolation, wherein a result of said auxiliary pixel interpolation step is outputted, in place of a result of removing said aliasing components, when the coefficient cannot be determined within said coefficient determining step.

7. The video signal processing method, as described in the claim 5, wherein said step of obtaining the output video frame produces 2n pieces of data from n pieces of the video frames, which are inputted in said step of inputting the video frames, and produces one video data by multiplying the 2n pieces of data by respective coefficients and thereafter adding them.

8. A video signal processing method, comprising the following steps of:
   inputting n pieces of video frames (n: an integer equal to or greater than two (2)); and
   composing said n pieces of video frames inputted, with increasing a number of pixels building up said video frame, and thereby obtaining an output video frame, wherein said step of obtaining the output video frame produces 2n pieces of data from n pieces of the video frames, which are inputted in said step of inputting the video frames, and produces one video data by multiplying the 2n pieces of data by respective coefficients and thereafter adding them, and wherein said 2n pieces of data are made of n pieces of data based on the data of n pieces of video frames, which are inputted in said step of inputting the video frames, and the data of the n pieces of video frames, which are obtained by shifting phases of the data of the n pieces of video frames inputted from said input step.

9. A video displaying apparatus, comprising:
an input portion, into which a first video frame and a second video frame are inputted;
a resolution converter portion, which is configured to obtain an output video frame with increasing a number of pixels building up the video frame up to 2 times, by composing the first video frame and the second video frame after conducting conversion process thereon; and
a display portion, which is configured to display a video upon basis of the output video frame from said resolution converter portion, wherein said resolution converter portion comprises:
 a pixel number converting portion, which is configured to increase respective pixel numbers of said first video frame and said second video frame inputted; and
 an aliasing component removing portion, which is configured to remove an aliasing component contained within the input video frames by shifting phases of said first and second video frames, the pixel numbers of which are increased, by $\pi/2$, respectively, and also by adding said first and second video frames shifted in said phases thereof and the first and second video frames before being shifted in the phases thereof.

10. The video displaying apparatus, as described in the claim 9, wherein said resolution converter portion further comprises:
a coefficient producing portion, which is configured to produce coefficients corresponding to said first and second video frames shifted in said phases thereof and the first and second video frames before being shifted in the phases thereof, respectively; and
a multiplying portion, which is configured to multiply the coefficients produced in said coefficient producing portion onto said first and second frames in front and after said phase sifting, wherein
said coefficient producing portion produces said coefficients upon basis of sampling phase difference between said first video frame and said second video frame.

11. The video displaying apparatus, as described in the claim 9, wherein said first video frame and said second video frame are video frames of moving pictures.

12. The video displaying apparatus, as described in the claim 9, wherein said first video frame and said second video frame are video frames contained within television broadcast signal.

13. The video displaying apparatus, as described in the claim 9, wherein said pixel number converting portion increases the numbers of pixels of said first and second video frames two (2) times.

14. The video displaying apparatus, as described in the claim 9, wherein said resolution converter portion outputs a piece of vide from the data of said first video frame and said second video frame, which are inputted from said input portion, by producing data of four (4) pieces of the video frames, multiplying coefficients on the data of said four (4) pieces of the video frames, respectively, and adding them.

15. A video displaying apparatus, comprising:
an input portion, into which a first video frame and a second video frame are inputted;
a resolution converter portion, which is configured to obtain an output video frame with increasing a number of pixels building up the video frame up to 2 times, by composing the first video frame and the second video frame after conducting conversion process thereon; and
a display portion, which is configured to display a video upon basis of the output video frame from said resolution converter portion,
wherein said resolution converter portion outputs a piece of vide from the data of said first video frame and said second video frame, which are inputted from said input portion, by producing data of four (4) pieces of the video frames, multiplying coefficients on the data of said four (4) pieces of the video frames, respectively, and adding them, and
wherein the data of said four (4) pieces of the video frames includes the data of the first video frame, which is inputted from said input portion, the data of the second video frame, the data obtained by shifting the data of said first video frame in the phase thereof, and the data obtained by shifting the data of the second video frame in the phase thereof.

* * * * *